(12) United States Patent
Yang et al.

(10) Patent No.: US 12,535,463 B2
(45) Date of Patent: Jan. 27, 2026

(54) LINEAR ARRAY SCANNING DEVICE AND CONTROL METHOD

(71) Applicant: ADVANCED TERAHERTZ SYSTEMS (SUZHOU) CO., LTD., Suzhou (CN)

(72) Inventors: Huanglin Yang, Suzhou (CN); Yang Wu, Suzhou (CN)

(73) Assignee: ADVANCED TERAHERTZ SYSTEMS (SUZHOU) CO., LTD., Suzhou (CN)

( * ) Notice: Subject to any disclaimer, the term of this patent is extended or adjusted under 35 U.S.C. 154(b) by 0 days.

(21) Appl. No.: 18/995,774

(22) PCT Filed: Sep. 1, 2023

(86) PCT No.: PCT/CN2023/116542
§ 371 (c)(1),
(2) Date: Jan. 16, 2025

(87) PCT Pub. No.: WO2024/074087
PCT Pub. Date: Apr. 11, 2024

(65) Prior Publication Data
US 2025/0258134 A1    Aug. 14, 2025

(30) Foreign Application Priority Data
Oct. 8, 2022   (CN) .......................... 202211219530.6

(51) Int. Cl.
*G01N 27/72*   (2006.01)
(52) U.S. Cl.
CPC .................. *G01N 27/72* (2013.01)
(58) Field of Classification Search
None
See application file for complete search history.

(56) References Cited

U.S. PATENT DOCUMENTS

| 4,228,473 A | 10/1980 | Himuro |
| 2006/0065820 A1* | 3/2006 | Nagai ................. G01R 33/032 250/225 |

(Continued)

FOREIGN PATENT DOCUMENTS

| CN | 1050276 A | 3/1991 |
| CN | 1609975 A | 4/2005 |

(Continued)

OTHER PUBLICATIONS

Xu Yongbing et al.; Spatially resolved magneto-optic Kerr effect measurement device; Date Published Aug. 24, 2016; Nanjing University of Technology; CN 105891744 A; (Year: 2016).*

(Continued)

*Primary Examiner* — Nasima Monsur
(74) *Attorney, Agent, or Firm* — ArentFox Schiff LLP

(57) ABSTRACT

A linear array scanning device includes: an object carrying assembly configured to carry a to-be-detected magnetic sample; a first magnetic field generation assembly configured to generate a first gradient magnetic field; a light source assembly configured to output linearly polarized light; a first light splitting assembly disposed on an emergent light path of the light source assembly and is configured to receive the linearly polarized light, split the linearly polarized light into multiple first sub-linearly polarized light, and project first sub-linearly polarized light propagating along a first direction to a first detection region of the to-be-detected magnetic sample; and a first detection assembly configured to receive first reflected linearly polarized light reflected back from the first detection region, detect polarization information of the first reflected linearly polarized light, and acquire magnetic domain uniformity information of the to-be-detected magnetic sample.

14 Claims, 10 Drawing Sheets

(56) References Cited

U.S. PATENT DOCUMENTS

| | | | |
|---|---|---|---|
| 2011/0144505 A1* | 6/2011 | Yamamoto | G01B 11/24 |
| | | | 356/369 |
| 2017/0363695 A1* | 12/2017 | Ueno | G01R 33/243 |
| 2020/0249288 A1 | 8/2020 | Inami et al. | |

FOREIGN PATENT DOCUMENTS

| | | |
|---|---|---|
| CN | 105372324 A | 3/2016 |
| CN | 105891744 A | 8/2016 |
| CN | 106405457 A | 2/2017 |
| CN | 107525769 A | 12/2017 |
| CN | 108414451 A | 8/2018 |
| CN | 108594142 A | 9/2018 |
| CN | 108957370 A | 12/2018 |
| CN | 114965292 A | 8/2022 |
| CN | 115291149 A | 11/2022 |
| JP | 2002-257718 A | 9/2002 |
| JP | 2013-205400 A | 10/2013 |

OTHER PUBLICATIONS

Notification of Grant received for Chinese Application No. 202211219530.6, mailed on Dec. 22, 2022, 3 pages (2 pages of English Translation and 1 page of Original Document).

International Search Report and Written Opinion received for PCT Patent Application No. PCT/CN2023/116542, mailed on Dec. 13, 2023, 14 pages (6 pages of English Translation and 8 pages of Original Document).

Kasiraj et al., "Magnetic domain imaging with a Scanning KERR effect microscope", IEEE transactions on magnetics, vol. 22, No. 5, Sep. 1986, pp. 837-839.

Office Action received for Chinese Patent Application No. 202211219530.6, mailed on Nov. 14, 2022, 12 pages (6 pages of English Translation and 6 pages of Original copy attached).

* cited by examiner

LINEAR ARRAY SCANNING DEVICE AND CONTROL METHOD

CROSS-REFERENCE TO RELATED APPLICATIONS

This is a National Stage Application filed under 35 U.S.C. 371 based on International Patent Application No. PCT/CN2023/116542, filed on Sep. 1, 2023, which claims priority to Chinese Patent Application No. 202211219530.6 filed on Oct. 8, 2022, the disclosures of both of which are incorporated herein by reference in their entireties.

TECHNICAL FIELD

The present application relates to the technical field of optical measurements, and in particularly, to a linear array scanning device and a control method.

BACKGROUND

At present, the uniformity of magnetic thin film layers on a wafer is usually detected by adopting a dot matrix scanning, which involves obtaining the hysteresis curves of individual discrete points in the array manner, thereby analyzing the uniformity of the magnetic thin film layers on the wafer.

However, in each magnetic field scanning, the reciprocation varying magnetic field needs to be established, thereby making the scanning process overly cumbersome. Moreover, the dot matrix scanning results in a relatively long scanning time and does not achieve the full coverage scanning.

SUMMARY

Based on this, it is necessary to provide a linear array scanning device and a control method capable of simplifying a scanning process and improving the scanning efficiency for the above-described technical problems.

A linear array scanning device includes an object carrying assembly, a first magnetic field generation assembly, a light source assembly, a first light splitting assembly and a first detection assembly. The object carrying assembly is configured to carry a to-be-detected magnetic sample. The first magnetic field generation assembly includes two groups of first magnetic assemblies disposed opposite to each other and is configured to generate a first gradient magnetic field, and the object carrying assembly is disposed within the first gradient magnetic field. The light source assembly is configured to output linearly polarized light. The first light splitting assembly is disposed on an emergent light path of the light source assembly and is configured to receive the linearly polarized light, split the linearly polarized light into multiple first sub-linearly polarized light, and project first sub-linearly polarized light propagating along a first direction among the multiple first sub-linearly polarized light to a first detection region of the to-be-detected magnetic sample. The first detection assembly is configured to receive first reflected linearly polarized light reflected back from the first detection region, detect polarization information of the first reflected linearly polarized light, and acquire magnetic domain uniformity information of the to-be-detected magnetic sample.

In the above-described linear array scanning device, the magnetic field generation assembly is configured to generate the gradient magnetic field, the object carrying assembly is configured to drive the to-be-detected magnetic sample to rotate and translate, so that the magnetic field intensity of the excitation magnetic field does not need to be changed in the scanning process, and thus the scanning process is simplified. In addition, the light source assembly is configured to output the linearly polarized light, the first light splitting assembly is configured to split the linearly polarized light into the multiple first sub-linearly polarized light, converge the first sub-linearly polarized light in the first direction to the first detection region of the to-be-detected magnetic sample and project the first reflected linearly polarized light reflected back from the first detection region to the first detection assembly, and the first detection assembly is configured to detect polarization information of the first reflected linearly polarized light and acquire magnetic domain uniformity information of a magnetic thin film layer at the first detection region, so that the linear array scanning is achieved, the magnetic domain uniformity information of one region can be obtained by one-time scanning, the scanning speed is improved, and thus the scanning time is greatly shortened.

In an embodiment, a first optical channel penetrating through a first magnetic assembly among the two groups of first magnetic assemblies is disposed within the first magnetic assembly, and part of the first light splitting assembly is disposed in the first optical channel.

In an embodiment, the first magnetic assembly includes a first iron core and a first coil, the first iron core includes a first main body portion and a first extension portion, the first coil is wound on the first main body portion, the first extension portion is disposed to be close to the object carrying assembly relative to the first main body portion, and the first extension portion is obliquely disposed towards an axis center of the first optical channel.

In an embodiment, the first extension portion includes a first end and a second end, the second end is disposed away from the first main body portion relative to the first end, and a vertical cross-sectional area of the first extension portion is gradually reduced from the first end to the second end.

In an embodiment, the first light splitting assembly includes a first light splitting mirror and a first focusing lens. The first light splitting mirror is disposed on an optical axis of the linearly polarized light and is configured to split the linearly polarized light into the multiple first sub-linearly polarized light. The first focusing lens is disposed in the first optical channel and disposed coaxially with the first light splitting mirror, and is configured to receive the first sub-linearly polarized light propagating along the first direction among the multiple first sub-linearly polarized light and converge the first sub-linearly polarized light propagating along the first direction among the multiple first sub-linearly polarized light to the first detection region of the to-be-detected magnetic sample.

In an embodiment, the first focusing lens includes a first housing, and the first housing is made of a non-magnetic conductive material.

In an embodiment, the first detection assembly includes a first polarization analyzer and a first linear array camera. The first polarization analyzer is configured to detect a polarization state and an angle of the first reflected linearly polarized light. The first linear array camera is disposed coaxially with the first polarization analyzer and is configured to receive the first reflected linearly polarized light passing through the first polarization analyzer and acquire magnetic domain uniformity information of a magnetic thin film layer in the first detection region.

In an embodiment, the linear array scanning device further includes a second light splitting mirror and a first imaging assembly. The second light splitting mirror is configured to receive the first reflected linearly polarized light reflected from the first detection region and project part of the first reflected linearly polarized light to the first polarization analyzer. The first imaging assembly is disposed coaxially with the second light splitting mirror and is configured to receive remaining part of the first reflected linearly polarized light to image the to-be-detected magnetic sample.

In an embodiment, the multiple first sub-linearly polarized light includes first sub-linearly polarized light propagating along the first direction and first sub-linearly polarized light propagating along a second direction. The linear array scanning device further includes a second magnetic field generation assembly, a second light splitting assembly and a second detection assembly. The second magnetic field generation assembly includes two groups of second magnetic assemblies disposed opposite to each other and is configured to generate a second gradient magnetic field, where the object carrying assembly is disposed within the second gradient magnetic field. The second light splitting assembly is configured to receive the first sub-linearly polarized light propagating along the second direction and project the first sub-linearly polarized light propagating along the second direction to a second detection region of the to-be-detected magnetic sample. The second detection assembly is configured to receive second reflected linearly polarized light reflected back from the second detection region, detect polarization information of the second reflected linearly polarized light, and acquire the magnetic domain uniformity information of the to-be-detected magnetic sample.

In an embodiment, the light source assembly includes a light source, a collimator and a polarizer. The light source is configured to generate detection light and output the detection light. The collimator is disposed on an optical axis of the detection light and is configured to collimate the detection light. The polarizer is disposed on the optical axis of the detection light and is configured to receive the collimated detection light and output the linearly polarized light.

In an embodiment, the detection light includes first sub-detection light and/or second sub-detection light, and the light source includes a first light-emitting element and a second light-emitting element. The first light-emitting element is configured to generate the first sub-detection light and output the first sub-detection light. The second light-emitting element is disposed adjacent to and in parallel with the first light-emitting element and is configured to generate the second sub-detection light and output the second sub-detection light, where the first light-emitting element and the second light-emitting element are independently turned on and turned off.

In an embodiment, the light source further includes a circuit board, and the first light-emitting element and the second light-emitting element are spliced in parallel on a surface of the circuit board.

In an embodiment, the object carrying assembly includes an object carrying table and a driving mechanism. The object carrying table is configured to carry the to-be-detected magnetic sample. The driving mechanism is connected to the object carrying table and is configured to drive the object carrying table to rotate and translate relative to the first magnetic field generation assembly.

In an embodiment, the linear array scanning device further includes a processing assembly. The processing assembly includes a processor and a data acquisition device. The processor is configured to output a digital control signal. The data acquisition device is connected to the processor, the first detection assembly and the object carrying assembly, where the data acquisition device is configured to: perform a digital-to-analogue conversion processing on the digital control signal, output an analog control signal to the object carrying assembly to control the object carrying assembly to drive the to-be-detected magnetic sample to rotate and translate, output a synchronization trigger signal to the first detection assembly to control the first detection assembly to synchronously detect the polarization information, and acquire the magnetic domain uniformity information of the to-be-detected magnetic sample. The data acquisition device is further configured to perform an analogue-to-digital conversion processing on the magnetic domain uniformity information, and transmit analogue-to-digital converted magnetic domain uniformity information to the processor.

A control method of a linear array scanning device is provided. The method is applied to the linear array scanning device described above and includes that: the light source assembly is controlled to output the linearly polarized light; the polarization information detected by the first detection assembly is acquired; in a case where the polarization information satisfies a preset condition, the first magnetic field generation assembly is controlled to be energized to generate the first gradient magnetic field; the object carrying assembly arranged outside the first gradient magnetic field is controlled to rotate and translate towards the first gradient magnetic field; and target polarization information detected by the first detection assembly is acquired, where the target polarization information is configured to characterize the magnetic domain uniformity information of the to-be-detected magnetic sample.

In the control method of the linear array scanning device described above, the light source assembly is controlled to output the linearly polarized light, and the polarization information detected by the first detection assembly is acquired in a case where the first magnetic field generation assembly is powered off, so that whether the first detection assembly is calibrated to a proper state is determined according to the polarization information detected by the first detection assembly. When the polarization information satisfies the preset condition, it represents that the first detection assembly has been calibrated to the proper state. The first magnetic field generation assembly is controlled to be energized to generate the first gradient magnetic field, the object carrying assembly arranged outside the first gradient magnetic field is controlled to rotate and translate towards the first gradient magnetic field, in a translation process, the to-be-detected magnetic sample is firstly saturated magnetized, and then the to-be-detected magnetic sample is affected by the first gradient magnetic field to change its own magnetic domain in the subsequent translation process, so that the target polarization information detected by the first detection assembly at this time is the magnetic domain uniformity information capable of characterizing the to-be-detected magnetic sample, to achieve the linear array scanning. The magnetic domain uniformity information of one region may be obtained by one-time scanning; therefore, the scanning speed is improved, and thus the scanning time is greatly shortened.

In an embodiment, that the target polarization information detected by the first detection assembly is acquired includes that: the object carrying assembly is controlled to perform a rotation translation operation, where the rotation translation operation includes: driving the to-be-detected magnetic sample to rotate for one circle to obtain magnetic domain uniformity information of a circular ring where the first detection region is located; the object carrying assembly is controlled to drive the to-be-detected magnetic sample to translate a first distance in a predetermined direction; and the rotation translation operation is repeatedly performed until a translation distance of the object carrying assembly reaches a target distance.

In an embodiment, where the linear array scanning device further includes an excitation power supply electrically connected to the first magnetic field generation assembly. The method further includes that: the object carrying assembly is controlled to drive the to-be-detected magnetic sample to move relative to the first magnetic field generation assembly; and in a case where the first detection region is a feature detection region, the excitation power supply is controlled to apply a reverse current to the first magnetic field generation assembly, and the object carrying assembly is controlled to drive the to-be-detected magnetic sample to move to an initial position along an original movement path.

In an embodiment, where the light source assembly includes a first light-emitting element and a second light-emitting element, the first light-emitting element is disposed adjacent to and in parallel with the second light-emitting element, and that the light source assembly is controlled to output the linearly polarized light includes that: a type of the to-be-detected magnetic sample is acquired; in a case where the to-be-detected magnetic sample is a first type of sample, the first light-emitting element and the second light-emitting element are controlled to be turned on synchronously; and in a case where the to-be-detected magnetic sample is a second type of sample, the first light-emitting element is controlled to be turned on and the second light-emitting element is controlled to be turned off.

BRIEF DESCRIPTION OF DRAWINGS

In order to describe technical solutions in embodiments of the present application or in the conventional art more clearly, the drawings used for describing the embodiments or the conventional art will be briefly introduced below. Apparently, the drawings in the following description are merely some embodiments of the present application. For those of ordinary skill in the art, other drawings may also be obtained without creative labor according to these drawings.

FIG. 6 is a schematic structural diagram of a first magnetic unit in an embodiment, where

Figure 1:
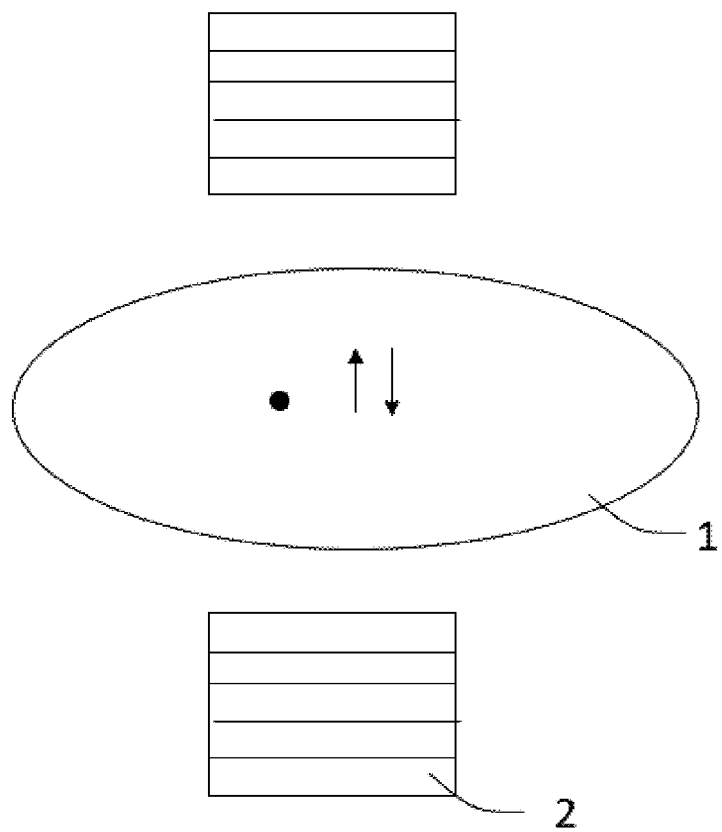
FIG. 1 is a schematic diagram of a dot matrix scanning scenario.

LIST OF REFERENCE NUMBERS 1 wafer
2 electromagnet
11 object carrying assembly
111 object carrying table
112 driving mechanism
12 to-be-detected magnetic sample
13 first magnetic assembly
131 first iron core
1311 first main portion
1312 first extension portion
132 first coil
133 first optical channel
14 light source assembly
141 light source
1411 first light-emitting element
1412 second light-emitting element
142 collimator
143 polarizer
144 first light homogenization module
145 second light homogenization module
15 first light splitting assembly
151 first light splitting mirror
152 first focusing lens
16 first detection assembly
161 first polarization analyzer
162 first linear array camera
17 second light splitting mirror
18 first imaging assembly
19 second magnetic assembly
191 second iron core
1911 second main body portion
1912 second extension portion
192 second coil
193 second optical channel
20 second light splitting assembly
201 third light splitting mirror
202 second focusing lens
21 second detection assembly
211 second polarization analyzer
212 second linear array camera
22 fourth light splitting mirror
23 second imaging assembly

DETAILED DESCRIPTION

In order to facilitate understanding of the present application, the present application will be described more fully below with reference to the accompanying drawings. Embodiments of the present application are shown in the accompanying drawings. However, the present application may be implemented in many different forms, and is not limited to the embodiments described herein. Rather, these embodiments are provided so that the disclosure of the present application will be thorough and complete.

Unless defined otherwise, all technical and scientific terms used herein have the same meaning as commonly understood by those skilled in the art to which the present application belongs. The terminology used herein in the specification of the present application is for the purpose of describing specific embodiments only and is not intended to be limiting of the present application.

It is to be understood that the terms "first", "second" and the like used in the present application may be used herein to describe various elements, but these elements are not limited by these terms. These terms are only used to distinguish one element from another element.

Spatially relative terms such as "under", "beneath", "lower", "below", "above", "upper" and the like, may be used herein to describe the relationship between one element or feature and another element or feature shown in the drawings. It is to be understood that the spatially relative terms may also include different orientations of the device in use and operation in addition to the orientations shown in the drawings. For example, if the device in the accompanying drawings is turned over, elements or features described as "beneath", "below" or "under" other elements or features would be oriented "above" other elements or features. Thus, the exemplary terms "beneath" and "under" may include both an upper orientation and a lower orientation. Moreover, the device may also include other orientations (such as, rotated 90 degrees or other orientations), and the spatial descriptors used herein are interpreted accordingly.

It is to be noted that when an element is considered to be "connected" to another element, the element may be directly connected to another element, or may be connected to another element through the central element. In addition, in a case where a transmission of electric signal or data exists between connected objects, "connected" in the following embodiments should be understood as "electrically connected to", "communicatively connected to", and the like.

As used herein, the singular form "a", "an" and "the" may also include the plural form, unless the context clearly indicates otherwise. It is also to be understood that terms "include/contain" or "have" and the like specify the presence of stated features, integers, steps, operations, assemblies, parts, or combinations thereof, but do not preclude the possibility of the presence or addition of one or more other features, integers, steps, operations, assemblies, parts, or combinations thereof. Moreover, the term "and/or" used in this specification includes any and all combinations of the associated listed items.

Figure 2:
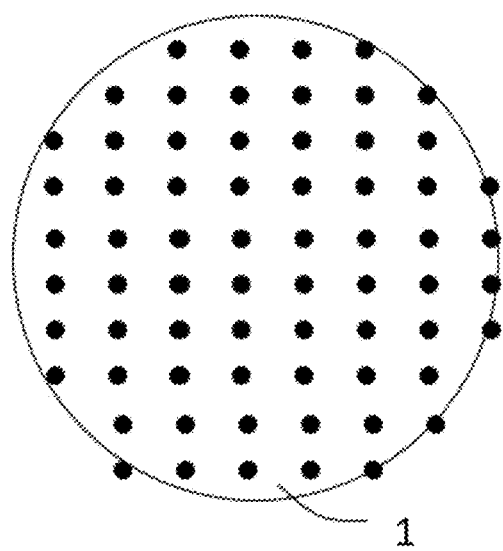
FIG. 2 is a schematic diagram of a dot matrix scanning process.

As described in the background, at present, the uniformity of magnetic thin film layers on a wafer 1 is usually detected by adopting a dot matrix scanning, which involves obtaining the hysteresis curves of individual discrete points in an array manner, thereby analyzing the uniformity of the magnetic thin film layers on the wafer. As shown in FIGS. 1 and 2, FIG. 1 is a schematic diagram of a dot matrix scanning scenario, and FIG. 2 is a schematic diagram of a dot matrix scanning process. It can be found that, in each magnetic field scanning, a reciprocation varying magnetic field needs to be established by an electromagnet 2, thereby making the scanning process overly cumbersome. Moreover, the dot matrix scanning results in a relatively long scanning time and does not achieve the full coverage scanning.

Based on this, it is necessary to provide a linear array scanning device capable of simplifying the scanning process and improving the scanning efficiency with respect to the above-described technical problems.

Figure 3:
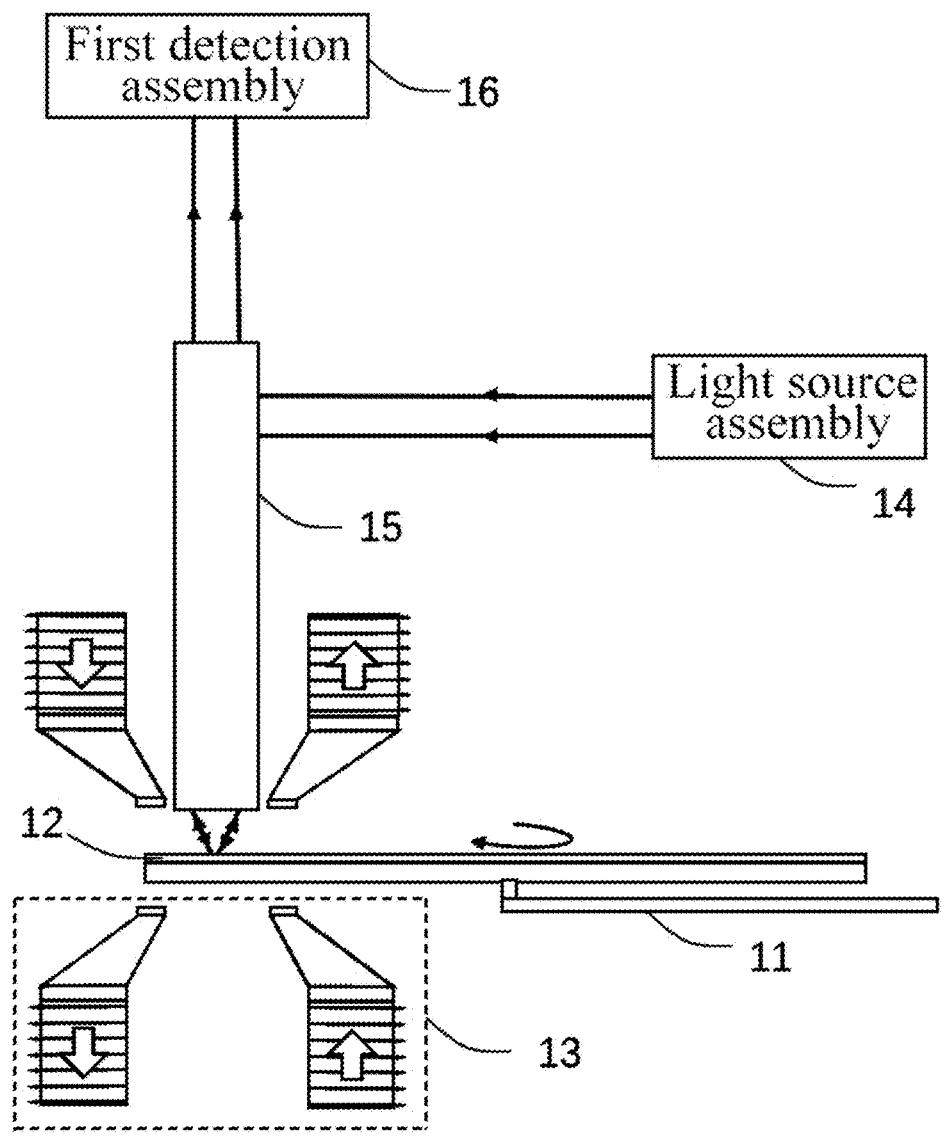
FIG. 3 is a schematic structural diagram of a linear array scanning device in an embodiment.

In an embodiment, as shown in FIG. 3, the present application provides a linear array scanning device. The linear array scanning device includes an object carrying assembly 11, a first magnetic field generation assembly, a light source assembly 14, a first light splitting assembly 15 and a first detection assembly 16. The object carrying assembly 11 is configured to carry a to-be-detected magnetic sample 12. The first magnetic field generation assembly includes two groups of first magnetic assemblies 13 disposed opposite to each other and is configured to generate a first gradient magnetic field, and the object carrying assembly 11 is disposed within the first gradient magnetic field. The light source assembly 14 is configured to output linearly polarized light. The first light splitting assembly 15 is disposed on an emergent light path of the light source assembly 14 and is configured to receive the linearly polarized light, split the linearly polarized light into multiple first sub-linearly polarized light, and project first sub-linearly polarized light propagating along a first direction among the multiple first sub-linearly polarized light to a first detection region of the to-be-detected magnetic sample 12. The first detection assembly 16 is configured to receive first reflected linearly polarized light reflected back from the first detection region, detect polarization information of the first reflected linearly polarized light, and acquire magnetic domain uniformity information of the to-be-detected magnetic sample 12.

Figure 4:
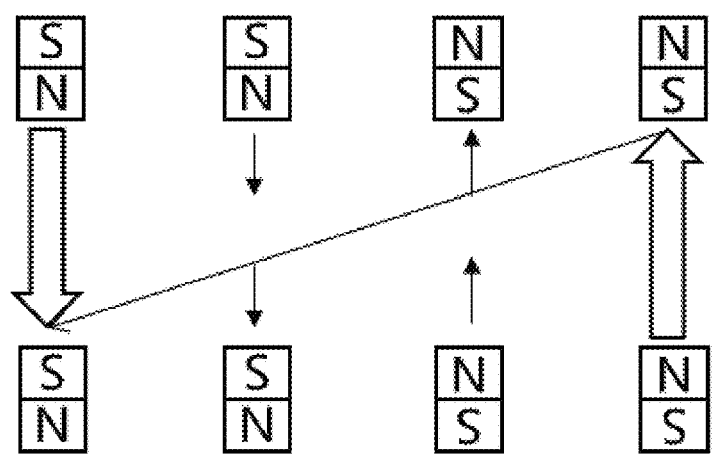
FIG. 4 is a schematic diagram of a first gradient magnetic field in an embodiment.

The distribution of the first gradient magnetic field is as shown in FIG. 4. After the object carrying assembly 11 carries the to-be-detected magnetic sample 12, the movement of the to-be-detected magnetic sample 12 may be driven by the movement of the object carrying assembly 11, for example, the rotation and translation of the object carrying assembly 11 may be controlled to drive the to-be-detected magnetic sample 12 to rotate and translate. The to-be-detected magnetic sample 12 may be the wafer.

Specifically, since the object carrying assembly 11 is disposed within the first gradient magnetic field, the to-be-detected magnetic sample 12 is also within the first gradient magnetic field, and the to-be-detected magnetic sample 12 is magnetized under the action of the first gradient magnetic field. After the light source assembly 14 outputs the linearly polarized light, the first light splitting assembly 15 is configured to receive the linearly polarized light, split the linearly polarized light into the multiple first sub-linearly polarized light, and project the first sub-linearly polarized light propagating along the first direction to the first detection region of the to-be-detected magnetic sample 12, then the first detection assembly 16 is configured to receive the first reflected linearly polarized light reflected back from the first detection region. Since the to-be-detected magnetic sample 12 is magnetized under the action of the first gradient magnetic field, the first reflected linearly polarized light carries magnetic domain information of the first detection region. According to Malus's Law, the first detection assembly 16 may acquire optical polarization angle change information caused by a magnetic domain state, and further acquire the magnetic domain uniformity information of the to-be-detected magnetic sample 12.

In an embodiment, a spacing between the two groups of first magnetic assemblies 13 disposed opposite to each other may be tens of millimeters, thereby ensuring the magnetization effect of the first gradient magnetic field on the to-be-detected magnetic sample 12, and further ensuring the accuracy of the magnetic domain uniformity information acquired by the first detection assembly 16.

In the above-described linear array scanning device, the first magnetic field generation assembly is configured to generate the gradient magnetic field, the object carrying assembly 11 is configured to drive the to-be-detected magnetic sample 12 to rotate and translate, so that the magnetic field intensity of the excitation magnetic field does not need to be changed in the scanning process, and thus the scanning process is simplified. In addition, the light source assembly 14 is configured to output the linearly polarized light, the first light splitting assembly 15 is configured to split the linearly polarized light into the multiple first sub-linearly polarized light, converge the first sub-linearly polarized light in the first direction to the first detection region of the to-be-detected magnetic sample 12 and project the first reflected linearly polarized light reflected back from the first detection region to the first detection assembly 16, and the first detection assembly 16 is configured to detect polarization information of the first reflected linearly polarized light and acquire magnetic domain uniformity information of a magnetic thin film layer in the first detection region, so that the linear array scanning is achieved, the magnetic domain uniformity information of one region can be obtained by one-time scanning, the scanning speed is improved, and thus the scanning time is greatly shortened.

Figure 5:
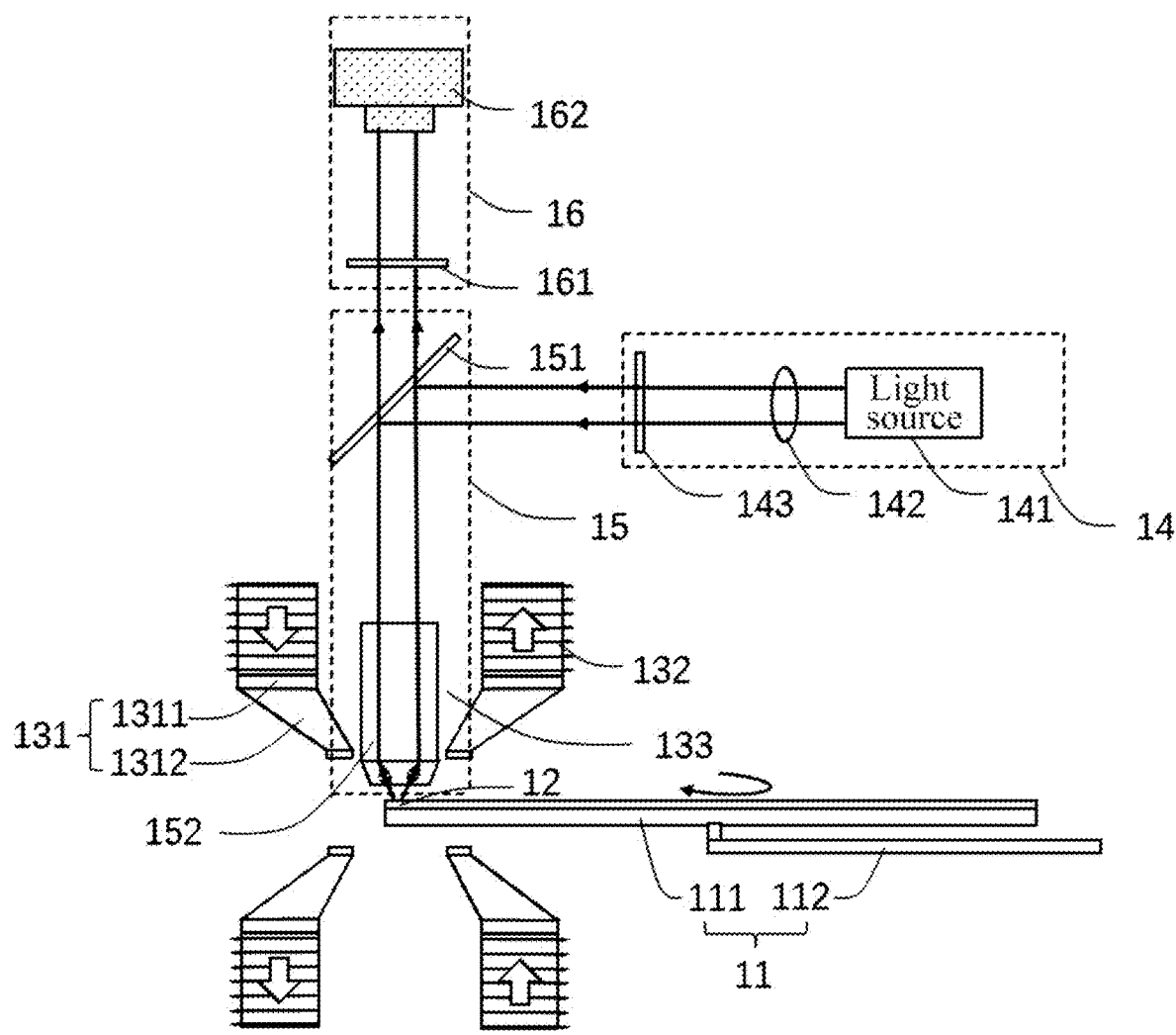
FIG. 5 is a schematic structural diagram of a linear array scanning device in another embodiment.

In an embodiment, as shown in FIG. 5, a first optical channel 133 penetrating through the first magnetic assembly 13 is disposed within the first magnetic assembly 13, and part of the first light splitting assembly 15 is disposed in the first optical channel 133.

In order to form the gradient magnetic field, the two groups of first magnetic assemblies 13 are respectively disposed on two vertical sides of the to-be-detected magnetic sample 12, and in this case, the first sub-linearly polarized light needs to pass through the first magnetic assembly 13 to be projected on the first detection region of the to-be-detected magnetic sample 12. Therefore, the first optical channel 133 penetrating through the first magnetic assembly 13 is disposed within the first magnetic assembly 13, so that the first sub-linearly polarized light passes through the first magnetic assembly 13, thereby avoiding the arrangement of the first magnetic assembly 13 from blocking light rays projected onto the to-be-detected magnetic sample 12 by the first light splitting assembly 15. Moreover, part of the first light splitting assembly 15 is disposed in the first optical channel 133, so that an emergent position of the first sub-linearly polarized light on the first light splitting assembly 15 is as close as possible to the to-be-detected magnetic sample 12, whereby the first sub-linearly polarized light forms light spots with a predetermined shape in the to-be-detected magnetic sample 12, and the structure of the linear array scanning device is more compact.

In an embodiment, the first magnetic assembly 13 includes multiple first magnetic units, and at least two first magnetic units are disposed at intervals to form a first optical channel 133 between the two first magnetic units. The first magnetic unit may be an electromagnet formed by a first iron core 131 and a first coil 132.

Figure 6A:
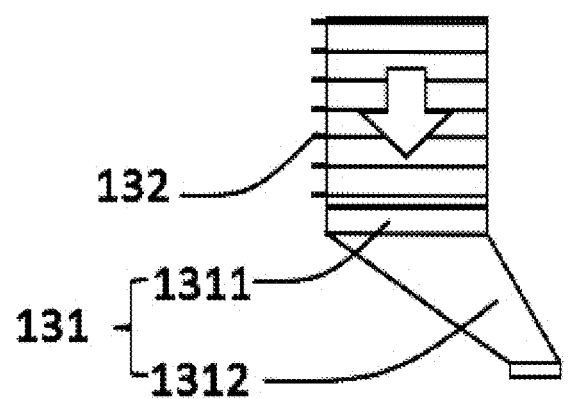
FIG. 6A is a front view.
Figure 6B:
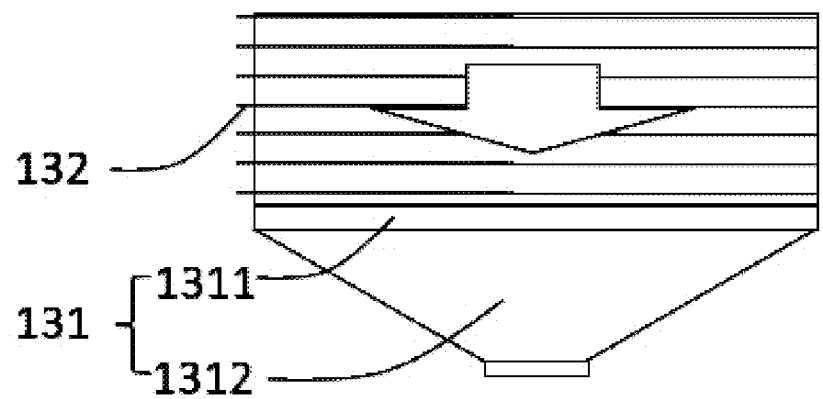
FIG. 6B is a right view.
Figure 6C:
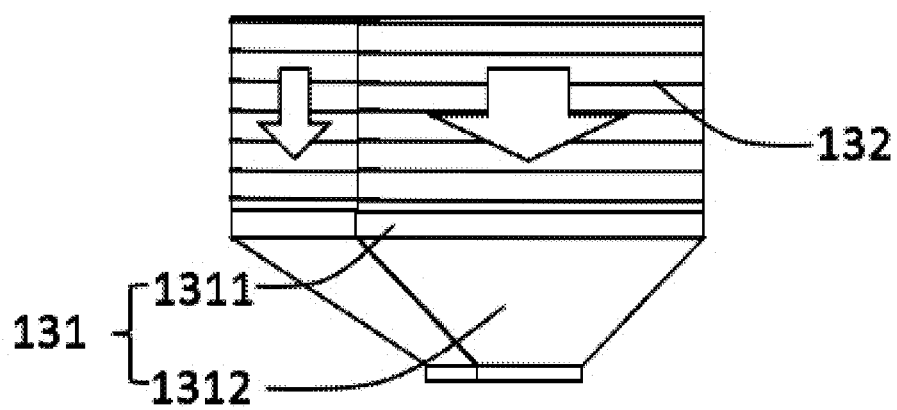
FIG. 6C is a left 45 degree view.
Figure 7:
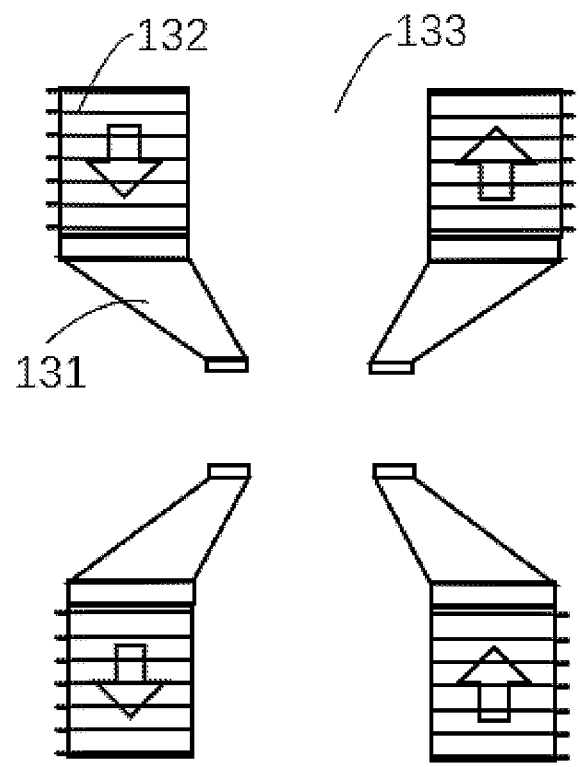
FIG. 7 is a schematic structural diagram of a first magnetic generation assembly in an embodiment.

Specifically, as shown in FIG. 5 to FIG. 7, the first magnetic assembly 13 includes the first iron core 131 and the first coil 132, the first iron core 131 includes a first main body portion 1311 and a first extension portion 1312, and the first coil 132 is wound around the first main body portion 1311. The first extension portion 1312 is disposed close to the object carrying assembly 11 relative to the first main body portion 1311, and the first extension portion 1312 is obliquely disposed towards an axis center of the first optical channel 133.

Since the first coil 132 is wound around the first main body portion 1311, after the first coil 132 is energized, the first iron core 131 is magnetized by a magnetic field generated by the energized first coil 132, and the magnetized iron core also becomes a magnet. Since the first extension portion 1312 belongs to a part of the magnet, the first extension portion 1312 is obliquely disposed near the first optical channel 133, so that a distance between ends of first extension portions 1312 of adjacent first iron cores 131 located on the same side of the object carrying assembly 11 is drawn closer, whereby the effect of decreasing gradient magnetic field intensity caused by increasing the distance between adjacent first iron cores 131 due to disposing the part of first light splitting assembly 15 in the first optical channel 133 is reduced, and thus the magnetizing effect of the gradient magnetic field is ensured. The first extension portion 1312 is disposed close to the object carrying assembly 11 relative to the first main body portion 1311, and the first extension portion 1312 is obliquely disposed towards the axis center of the first optical channel 133, so that the first extension portion 1312 may be disposed close to the to-be-detected magnetic sample 12, thereby improving the magnetizing effect of the first gradient magnetic field on the to-be-detected magnetic sample 12.

In an embodiment, as shown in FIG. 5, the first extension portion 1312 includes a first end and a second end, the second end is disposed away from the first main body portion 1311 relative to the first end, and a vertical cross-sectional area of the first extension portion 1312 is gradually reduced from the first end to the second end.

It is to be understood that, after the first iron core 131 is magnetized by the magnetic field generated by the energized first coil 132, the first iron core 131 becomes a magnet, and the magnetic field intensity of the magnetic field generated by the magnet increases as the cross-sectional area of the magnet decreases. Therefore, the vertical cross-sectional area of the first extension portion 1312 is gradually reduced from the first end to the second end, so that the magnetic field intensity of the magnetic field generated at the second end of the first extension portion 1312 increases. Since the second end of the first extension portion 1312 is disposed close to the object carrying assembly 11, the magnetizing effect of the first magnetic field generation assembly on the to-be-detected magnetic sample 12 is improved.

It is to be understood that, when the first coil 132 works, heat is generated, thereby resulting in an increase in the overall temperature of the first magnetic assembly 13, further directly resulting in a decrease in the magnetic field strength, and resulting in an unstable magnetic field and a decrease in efficiency, moreover, a spacing between the first magnetic assembly 13 and the to-be-detected magnetic sample 12 is small, so that the to-be-measured magnetic sample 12 may be damaged by heat, however, the above factors will affect the measurement accuracy. Therefore, the linear array scanning device may further include a heat dissipation assembly, and the heat dissipation assembly is configured to perform a heat dissipation processing on the first magnetic field generation assembly. Optionally, the heat dissipation assembly may include a heat dissipation member and a water pipe, the heat dissipation member is in contact with the first magnetic field generation assembly, the water pipe is in contact with the heat dissipation member, and the water pipe is configured to circulate a heat dissipation medium, where the heat dissipation member may be made of iron. Optionally, the heat dissipation assembly may include a semiconductor refrigerator, and the first magnetic field generation assembly is cooled by contacting a cold end of the semiconductor refrigerator with the first magnetic field generation assembly. Optionally, the first magnetic field generation assembly may also be cooled in an air cooling mode, for example, the heat dissipation assembly may be a fan, and the first magnetic field generation assembly is cooled by blowing the first magnetic field generation assembly by the fan.

In an example, the first magnetic assembly 13 may include a permanent magnet.

In an embodiment, the first magnetic assembly 13 may be fixed by a bracket, and the bracket is made of a non-magnetic conductive material to avoid affecting the distribution of the first gradient magnetic field.

In an embodiment, the linear array scanning device further includes an excitation power source electrically connected to the first magnetic field generation assembly, and the excitation power supply outputs a constant current to the first coil 132, so that the first magnetic field generation assembly can provide a stable first gradient magnetic field. The intensity of the first gradient magnetic field is related to the output current of the excitation power supply, the excitation power supply outputs a current with a fixed numerical value, so that the stability of the intensity of the first gradient magnetic field may be kept. In this case, the object carrying assembly 11 arranged outside the first gradient magnetic field is controlled to drive the to-be-detected magnetic sample 12 to rotate and translate towards the first gradient magnetic field, it is unnecessary to change the magnetic field intensity of the excitation magnetic field during the measurement process. Compared with the manner of establishing the reciprocation varying magnetic field in the dot matrix scanning, the gradient magnetic field in the present application can greatly simplify the scanning process, thereby the scanning time is effectively shortened.

It is to be understood that, the magnetic field intensity within the first gradient magnetic field decreases as a distance between the first magnetic assembly 13 and the to-be-detected magnetic sample 12 increases. When the distance between the first magnetic assembly 13 and the to-be-detected magnetic sample 12 is relatively large, the magnetic field intensity within the first gradient magnetic field can be ensured by increasing the current input by the excitation power supply to the first coil 132.

The linear array scanning device described in this embodiment may be applied to the testing of the magnetic domain uniformity of a wafer with a relatively small size.

In an embodiment, as shown in FIG. 5, the first light splitting assembly 15 includes a first light splitting mirror 151 and a first focusing lens 152. The first light splitting mirror 151 is disposed on an optical axis of the linearly polarized light and is configured to split the linearly polarized light into multiple first sub-linearly polarized light. The first focusing lens 152 is disposed in the first optical channel 133 and is disposed coaxially with the first light splitting mirror 151, and the first focusing lens 152 is configured to receive the first sub-linearly polarized light propagating along the first direction and converge the first sub-linearly polarized light propagating along the first direction to the first detection region of the to-be-detected magnetic sample 12, so that the light can be projected onto the to-be-detected magnetic sample 12.

Specifically, the first light splitting mirror 151 is disposed on the optical axis of the linearly polarized light, after the linearly polarized light is received, the linearly polarized light is split into multiple first sub-linearly polarized light, the first sub-linearly polarized light propagating along the first direction is incident into the first focusing lens 152, and the first focusing lens 152 focuses the incident first sub-linearly polarized light and converges the first sub-linearly polarized light to the first detection region of the to-be-detected magnetic sample 12. It is to be understood that the light is reflected in the first detection region, first reflected linearly polarized light reflected back along an original path from the first detection region may be incident into the first detection assembly 16, after the first detection assembly 16 receives the first reflected linearly polarized light, the first detection assembly may detect the polarization information of the first reflected linearly polarized light and thus acquire the magnetic domain uniformity information of the to-be-detected magnetic sample 12.

In an embodiment, the first focusing lens 152 includes a first housing and a first focusing lens body mounted within the first housing. The first housing is made of the non-magnetic conductive material, thereby preventing the first housing from being magnetized to form the interfering magnetic field, reducing the interference factor, and ensuring the accuracy of the polarization information obtained by detection of the first detection assembly 16.

In some embodiments, the first housing may be made of plastic.

In an embodiment, as shown in FIG. 5, the first detection assembly 16 includes a first polarization analyzer 161 and a first linear array camera 162. The first polarization analyzer 161 is configured to detect a polarization state and an angle of the first reflected linearly polarized light. The first linear array camera 162 is disposed coaxially with the first polarization analyzer 161 and is configured to receive the first reflected linearly polarized light passing through the first polarization analyzer 161 and acquire magnetic domain uniformity information of a magnetic thin film layer in the first detection region.

Figure 8:
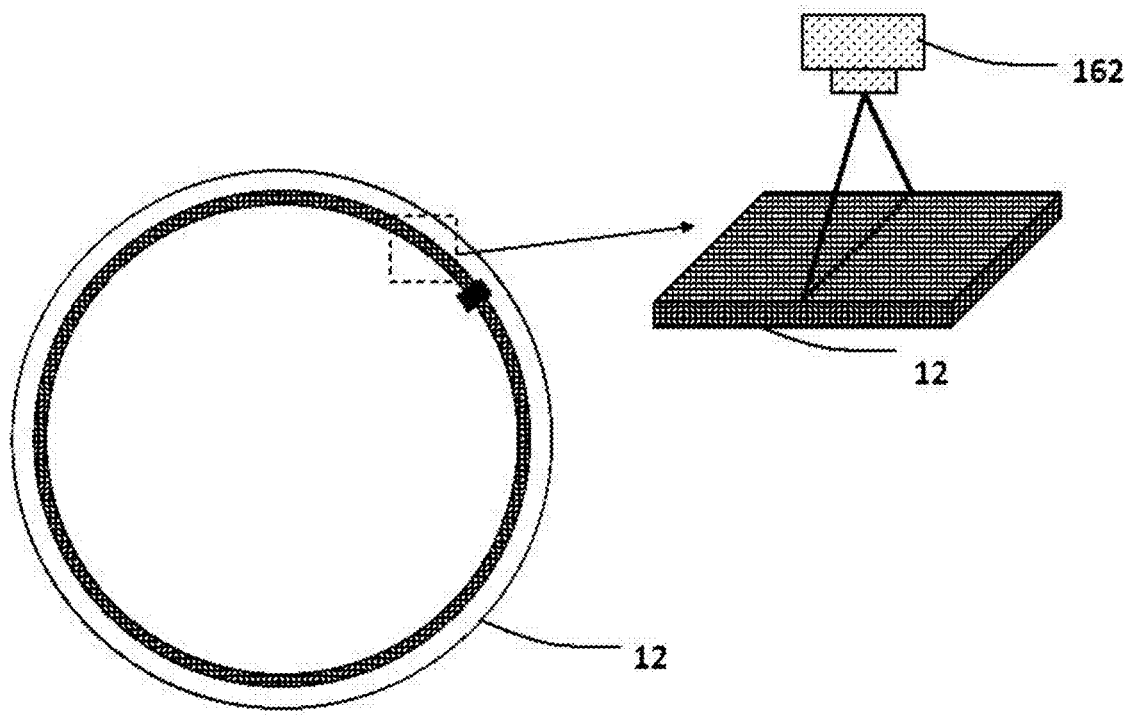
FIG. 8 is a schematic diagram of a linear array scanning process in an embodiment.
Figure 9:
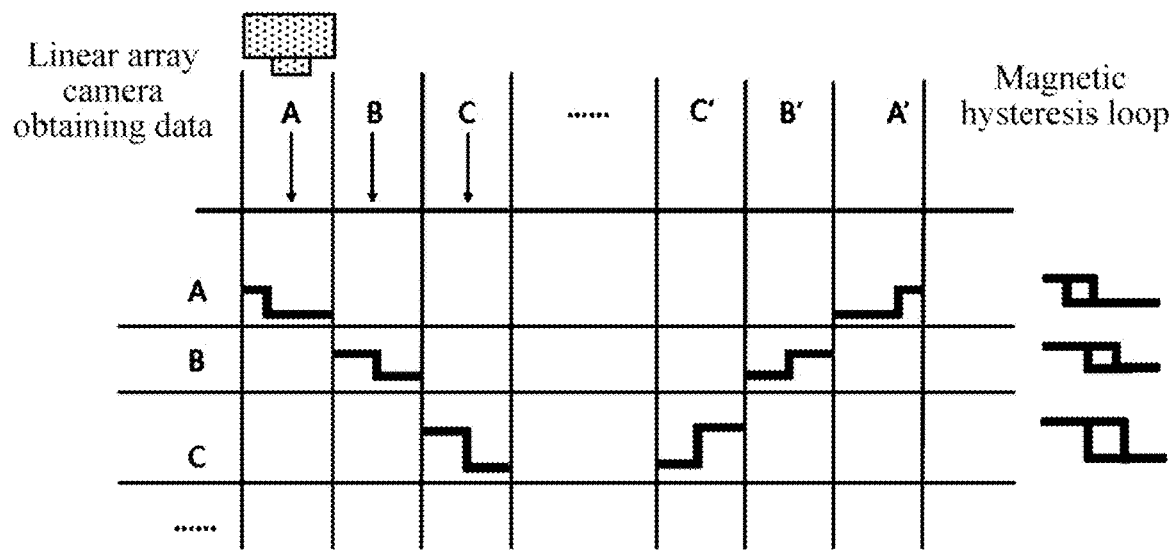
FIG. 9 is a diagram showing a principle that a magnetic hysteresis loop is obtained from data acquired by a linear array camera in an embodiment.
Figure 10:
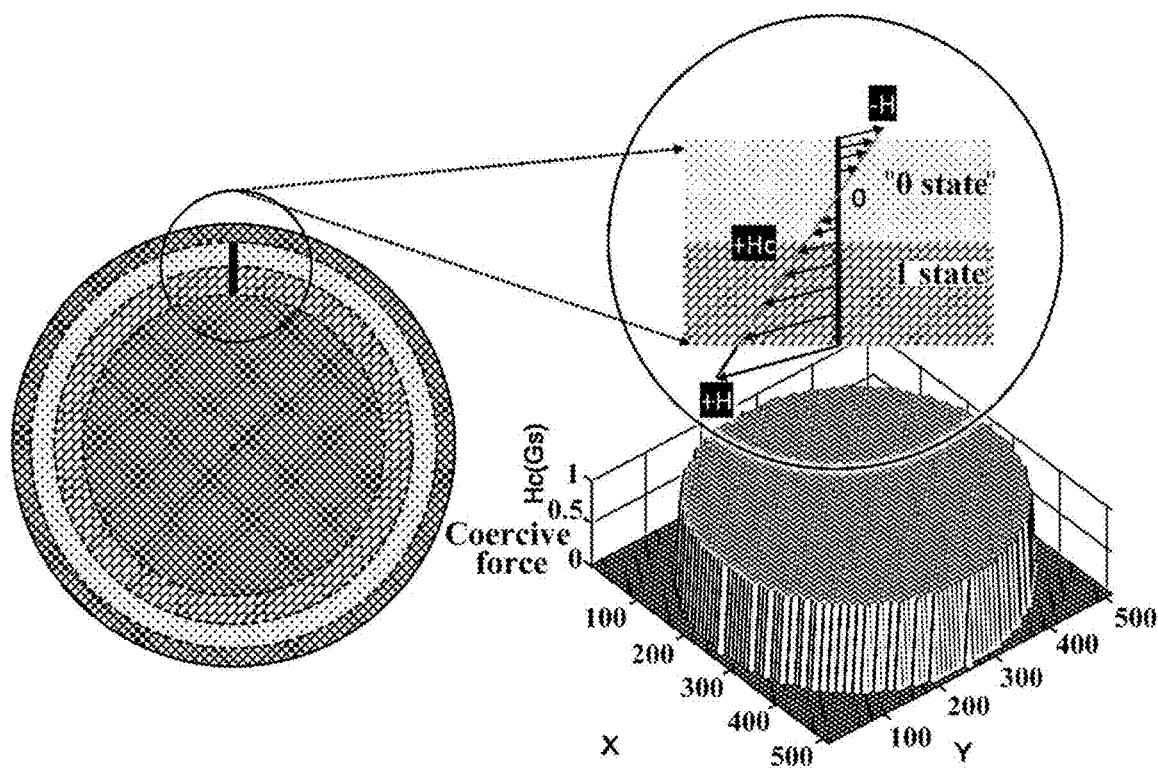
FIG. 10 is a diagram showing a measurement principle when a magnetic layer of the obtained to-be-detected magnetic sample is uniform in an embodiment.
Figure 11:
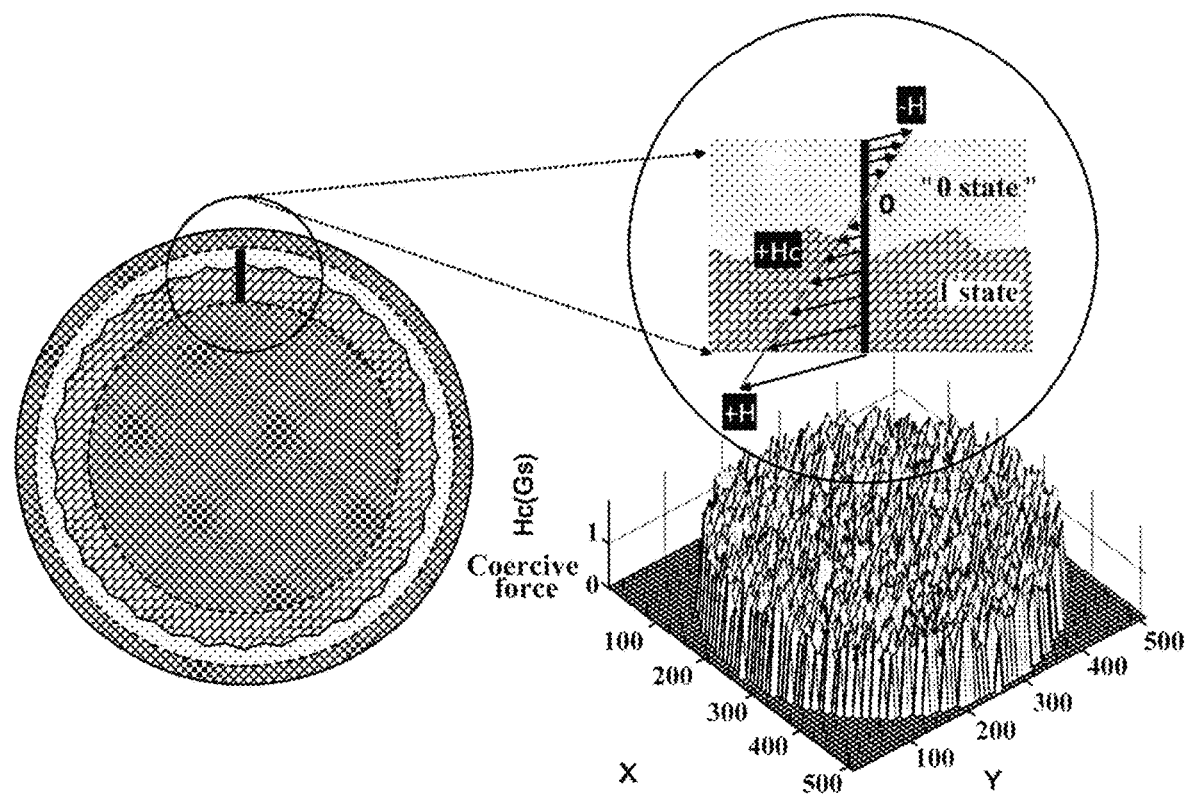
FIG. 11 is a diagram showing a measurement principle when a magnetic layer of the obtained to-be-detected magnetic sample is not uniform in an embodiment.
Figure 12:
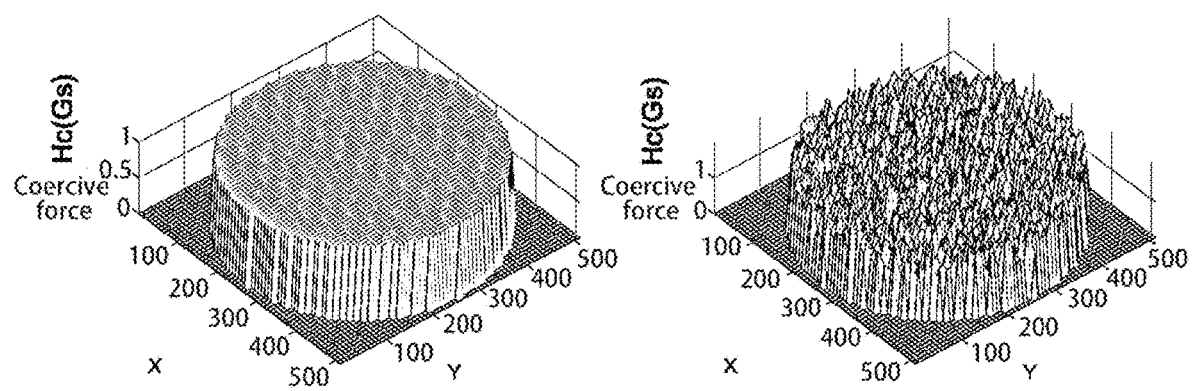
FIG. 12 is a diagram comparing the obtained uniform coercive field distribution map and the obtained non-uniform coercive field distribution map in an embodiment.

Specifically, as shown in FIG. 8, the first reflected linearly polarized light with the magnetic domain information of the first detection region is reflected back along the original path from the to-be-detected magnetic sample 12, and enters the first linear array camera 162. Since the first reflected linearly polarized light with the magnetic domain information of the first detection region changes its original polarization angle, the stronger the light intensity collected by the first linear array camera 162 is, the more the polarized light deflects, that is, the larger the polarization angle is. The first polarization analyzer 161 and the first linear array camera 162 are cooperated so that the change of the transmitted light intensity reflected back from the first detection region before and after the generation of the first gradient magnetic field can be acquired, the polarization information of the first reflected linearly polarized light can be detected, and the magnetic domain uniformity information of the to-be-detected magnetic sample 12 can be acquired.

In an application, as shown in FIG. 9 to FIG. 12, a Magneto-Optical Kerr Angle (light intensity light-dark signal) of the magnetic thin film layer uses +Hc as a cut point, a state of a magnetic recording layer is turned into a "1 state" for a region where the magnetic field intensity is greater than +Hc, and an intensity of a signal collected by the first linear array camera 162 is relatively weak. The magnetic recording layer retains an original state "0 state" for a region where the magnetic field intensity is less than +Hc, and the intensity of the signal collected by the first linear array camera 162 is relatively strong. The to-be-detected magnetic sample 12 is rotated, so that a position of a magnetic layer coercive field Hc of a circular ring where the first detection region of the to-be-detected magnetic sample 12 is located may be obtained. The to-be-detected magnetic sample 12 is cooperatively translated, so that the position information of the magnetic layer coercive field Hc of the entire surface of the to-be-detected magnetic sample 12 may be obtained.

The data acquisition mode of the first linear array camera 162 is a direct reading data mode or a phase-locked acquisition mode. In order to prevent external stray light, such as natural light, from crosstalk to projected light rays, a phase-locked signal acquisition mode may be used to modulate the incident light, where a modulation parameter is such as light intensity or frequency (frequency of 100 Hz). Since the natural light has an uncertain flickering frequency, a mode for the first linear array camera 162 to collect light is a lock-in mode, and only signals of a preset frequency (such as 100 Hz) are locked. The natural light is converted into a direct current voltage signal, and the projected light ray is converted into an alternating current voltage signal. After the voltage signal mixed by the direct current voltage signal and the alternating current voltage signal is obtained by the first linear array camera 162, the voltage signal with the preset frequency is locked, and the alternating current voltage signal is separated from the mixed signal, thereby preventing the interference of the natural light.

In this embodiment, the magnetic field uniformity on the magnetic thin film layer of the wafer and the uniformity of coercive force of the magnetic domains can be resolved by using the light intensity bright and dark portion of the first linear array camera 162, and the resolution is high. Compared with the dot matrix scanning, in the linear array scanning, the continuously collection may be performed, and the sampling speed is very fast, the scanning speed is further improved, and the scanning time is greatly shortened.

Figure 13:
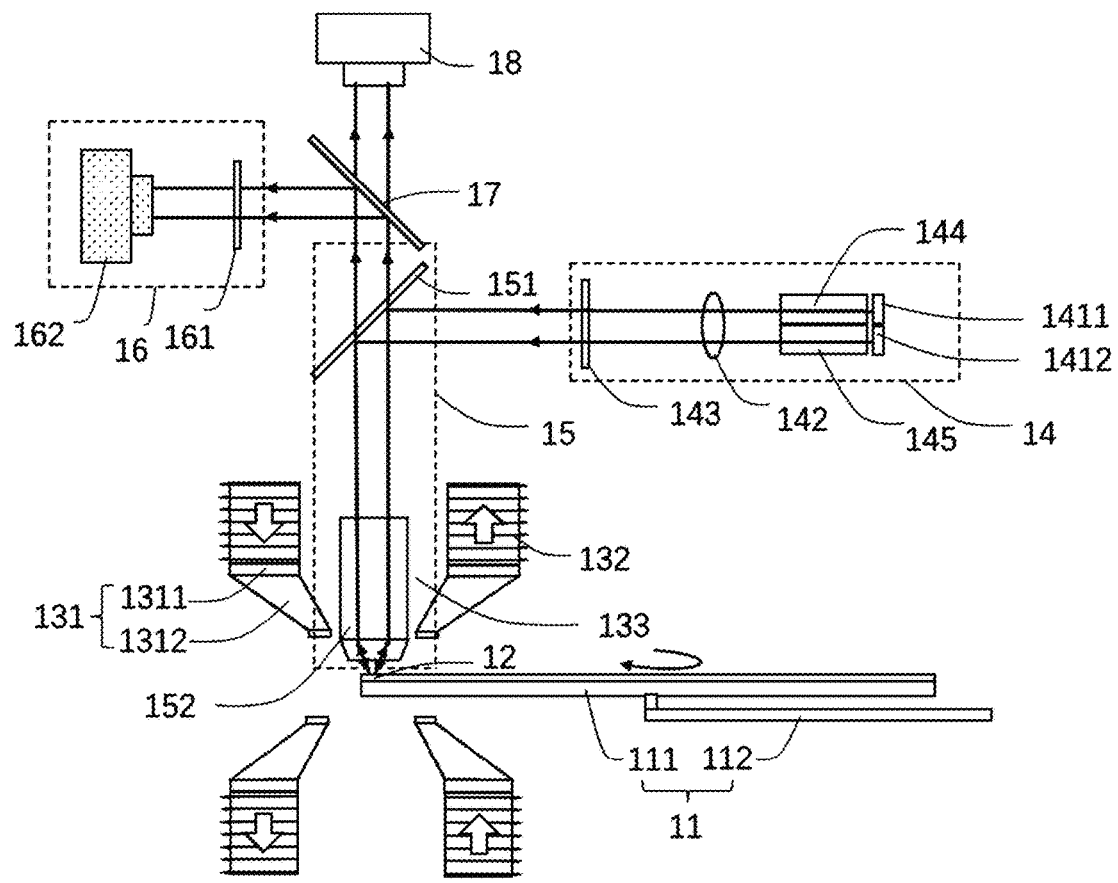
FIG. 13 is a schematic structural diagram of a linear array scanning device in still another embodiment.

In an embodiment, as shown in FIG. 13, the linear array scanning device further includes a second light splitting mirror 17 and a first imaging assembly 18. The second light splitting mirror 17 is configured to receive the first reflected linearly polarized light reflected from the first detection region and project part of the first reflected linearly polarized light to the first polarization analyzer 161. The first imaging assembly 18 is disposed coaxially with the second light splitting mirror 17 and is configured to receive remaining part of the first reflected linearly polarized light to image the to-be-detected magnetic sample 12.

Specifically, the second light splitting mirror 17 receives the first reflected linearly polarized light reflected from the first detection region, splits the first reflected linearly polarized light into two parts, and projects a part of the first reflected linearly polarized light onto the first polarization analyzer 161 and projects another part of the first reflected linearly polarized light onto the first imaging assembly 18, so that when the polarization information of the first reflected linearly polarized light is detected by the first detection assembly 16, the to-be-detected magnetic sample 12 may also be imaged through the first imaging assembly 18, to observe the morphology of the to-be-detected magnetic sample 12, where the first imaging assembly 18 may include an imaging camera.

Figure 14:
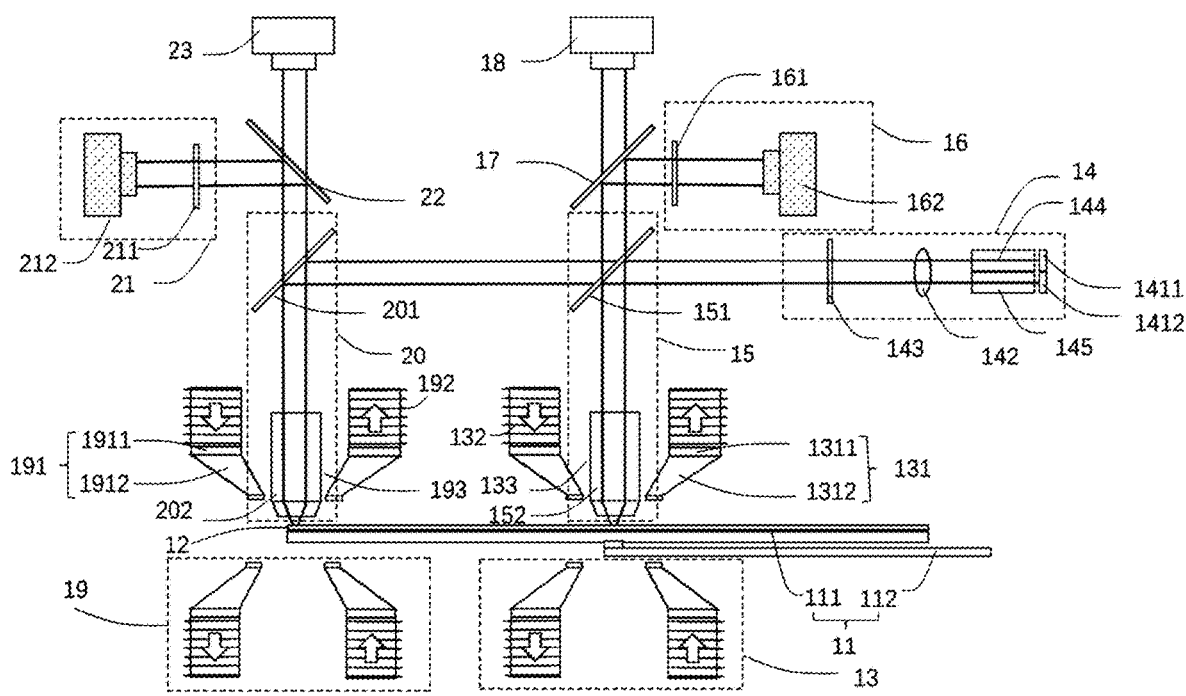
FIG. 14 is a schematic structural diagram of a linear array scanning device in yet another embodiment.

In an embodiment, as shown in FIG. 14, the multiple first sub-linearly polarized light includes first sub-linearly polarized light propagating along the first direction and first sub-linearly polarized light propagating along the second direction, and the linear array scanning device further includes a second magnetic field generation assembly, a second light splitting assembly 20 and a second detection assembly 21. The second magnetic field generation assembly includes two groups of second magnetic assemblies 19 disposed opposite to each other and is configured to generate a second gradient magnetic field, and the object carrying assembly 11 is disposed within the second gradient magnetic field. The second light splitting assembly 20 is configured to receive the first sub-linearly polarized light propagating along the second direction and project the first sub-linearly polarized light propagating along the second direction to the second detection region of the to-be-detected magnetic sample 12. The second detection assembly 21 is configured to receive second reflected linearly polarized light reflected back from the second detection region, detect polarization information of the second reflected linearly polarized light, and acquire the magnetic domain uniformity information of the to-be-detected magnetic sample 12.

It is to be understood that the second light splitting assembly 20 is configured to converge the first sub-linearly polarized light in the second direction to the second detection region of the to-be-detected magnetic sample 12 and project the second reflected linearly polarized light reflected back from the second detection region onto the second detection assembly 21, whereby the polarization information of the second reflected linearly polarized light is detected by the second detection assembly 21, and the magnetic domain uniformity information of the magnetic thin film layer in the second detection region is acquired, so that the linear array scanning device can scan the first detection region and the second detection region simultaneously, that is, magnetic domain uniformity information of two detection regions may be obtained by one scanning, thereby further improving the scanning speed and shortening the scanning time.

Optionally, in the presence of only the first gradient magnetic field, the first detection region corresponds to an edge region of the sample at an initial moment.

Optionally, when the first gradient magnetic field and the second gradient magnetic field exist simultaneously, at the initial moment, the first detection region corresponds to a central region of the sample, and the second detection region corresponds to the edge region. In this case, during testing, compared with a manner in which only the first gradient magnetic field exists, in this manner, the displacement distance of the to-be-detected magnetic sample 12 can be reduced by half, thereby further improving the scanning speed.

The first direction is a direction in which the to-be-detected magnetic sample 12 is located relative to the first light splitting assembly 15, i. e., an emergent direction of the linearly polarized light after being reflected by the first light-splitting mirror 151. In FIG. 2, the first direction is a downward direction, and the second direction is a direction in which the second light splitting assembly 20 is located relative to the first light splitting assembly 15, i.e., an emergent direction of the linearly polarized light after passing through the first light splitting mirror 151. The second direction is a left direction in FIG. 2. The first detection region is a region covered by light spots formed by the first sub-linearly polarized light in the to-be-detected magnetic sample 12 (i. e., a range of one-time imaging), and the second detection region is a region covered by light spots formed by second sub-linearly polarized light in the to-be-detected magnetic sample 12.

In an embodiment, as shown in FIG. 14, the second light splitting assembly 20 includes a third light splitting mirror 201 and a second focusing lens 202. The third light splitting mirror 201 is disposed on an optical axis of the first sub-linearly polarized light propagating along the second direction and is configured to receive the first sub-linearly polarized light propagating along the second direction and output the second sub-linearly polarized light. The second focusing lens 202 is disposed on an optical path of the second sub-linearly polarized light projected by the third light splitting mirror 201 and is configured to receive the second sub-linearly polarized light and converge the second sub-linearly polarized light to the second detection region of the to-be-detected magnetic sample 12.

Specifically, after the third light splitting mirror 201 receives the first sub-linearly polarized light propagating along the second direction, the third light splitting mirror 201 outputs the second sub-linearly polarized light and projects the second sub-linearly polarized light to the first focusing lens 152, and the first focusing lens 152 focuses the incident second sub-linearly polarized light and converges the second sub-linearly polarized light to the second detection region of the to-be-detected magnetic sample 12. It is to be understood that the light may be reflected in the second detection region, second reflected linearly polarized light reflected back along the original path from the second detection region may be incident into the second detection assembly 21, after the second detection assembly 21 receives the second reflected linearly polarized light, the second detection assembly 21 may detect the polarization information of the second reflected linearly polarized light and thus acquire the magnetic domain uniformity information of the to-be-detected magnetic sample 12.

In an embodiment, the second focusing lens 202 includes a second housing and a second focusing lens body mounted within the second housing, and the second housing is made of the non-magnetic conductive material.

In an embodiment, as shown in FIG. 14, the second detection assembly 21 includes a second polarization analyzer 211 and a second linear array camera 212. The second polarization analyzer 211 is configured to detect a polarization state and an angle of the second reflected linearly polarized light. The second linear array camera 212 is disposed coaxially with the second polarization analyzer 211 and is configured to receive the second reflected linearly polarized light passing through the second polarization analyzer 211 and acquire magnetic domain uniformity information of the to-be-detected magnetic sample 12.

Specifically, the second reflected linearly polarized light is filtered by using the second polarization analyzer 211, and then the second linear array camera 212 receives the filtered second reflected linearly polarized light. According to Malus's Law, the second detection assembly 21 may acquire optical polarization angle change information caused by a magnetic domain state, and further acquire the magnetic domain uniformity information of the to-be-detected magnetic sample 12.

In an embodiment, as shown in FIG. 14, the linear array scanning device further includes a fourth light splitting mirror 22 and a second imaging assembly 23. The fourth light splitting mirror 22 is configured to receive the second reflected linearly polarized light reflected from the second detection region and project part of the second reflected linearly polarized light to the second detection assembly 21. The second imaging assembly 23 is configured to receive the remaining part of the second reflected linearly polarized light to image the to-be-detected magnetic sample 12.

In an embodiment, similarly, in order to avoid the provision of the second magnetic assembly 19 from shielding the light projected onto the to-be-detected magnetic sample 12 by the second light splitting assembly 20, a second optical channel 193 penetrating through the second magnetic assembly 19 is disposed within the second magnetic assembly 19, and part of the second light splitting assembly 20 is disposed in the second optical channel 193, so that the light may be projected onto the to-be-detected magnetic sample 12.

In an embodiment, the second magnetic assembly 19 includes multiple second magnetic units, at least two second magnetic units are disposed at intervals to form the second optical channel 193 between the two second magnetic units, and the second focusing lens 202 is disposed in the second optical channel 193. The second magnetic unit may be an electromagnet formed by a second iron core 191 and a second coil 192.

In an embodiment, the second magnetic assembly 19 includes the second iron core 191 and the second coil 192, the second iron core 191 further includes a second main body portion 1911 and a second extension portion 1912, and the second coil 192 is wound around the second main body portion 1911. The second extension portion 1912 is disposed close to the object carrying assembly 11 relative to the second main body portion 1911, and the second extension portion 1912 is obliquely disposed towards an axis center of the second optical channel 193.

In some embodiments, the structure of the second magnetic assembly 19 is the same as the structure of the first magnetic assembly 13, to ensure the consistency of magnetic field intensity and the like of the first gradient magnetic field and the second gradient magnetic field, thereby reducing influence of the testing device, i.e., the linear array scanning device, on accuracy of the testing result.

In an embodiment, as shown in FIG. 14, the light source assembly 14 includes a light source 141, a collimator 142 and a polarizer 143. The light source 141 is configured to generate detection light and output the detection light, the collimator 142 is disposed on an optical axis of the detection light and is configured to collimate the detection light. The polarizer 143 is disposed on the optical axis of the detection light and is configured to receive the collimated detection light and output the linearly polarized light.

The light source 141 may be an LED light source.

It is to be understood that, the initial light generated by the light source 141 is generally divergent light, and the detection light is collimated by the collimator 142, so that the light loss during transmission can be reduced, and light spots projected onto the to-be-detected magnetic sample 12 may be ensured to be in a predetermined shape. However, the collimated detection light is not polarized light, and the polarizer 143 is required to perform a polarization processing on the collimated detection light to output linearly polarized light, thereby achieving the linear array scanning of the to-be-detected magnetic sample 12.

In an embodiment, as shown in FIG. 13 or FIG. 14, the detection light includes first sub-detection light and/or second sub-detection light, and the light source 141 includes a first light-emitting element 1411 and a second light-emitting element 1412. The first light-emitting element 1411 is configured to generate first sub-detection light and output the first sub-detection light. The second light-emitting element 1412 is disposed adjacent to and in parallel with the first light-emitting element 1411 and is configured to generate the second sub-detection light and output the second sub-detection light. The first light-emitting element 1411 and the second light-emitting element 1412 are independently turned on and turned off.

Figure 15:
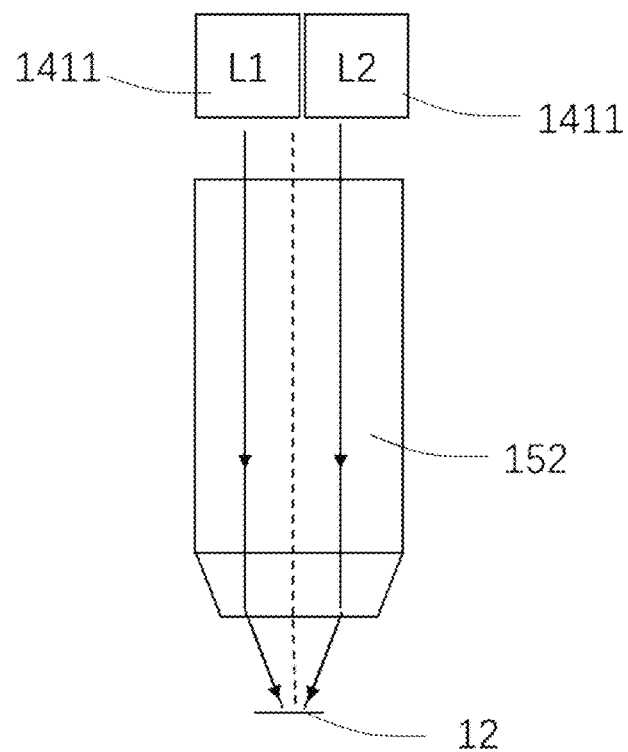
FIG. 15 is a schematic diagram showing a measurement in which a first light-emitting element and a second light-emitting element are turned on in an embodiment.
Figure 16:
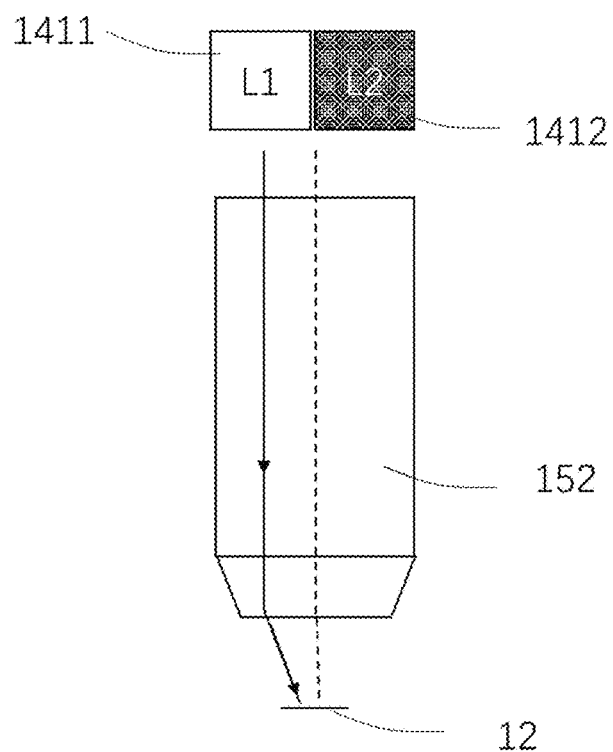
FIG. 16 is a schematic diagram showing a measurement in which a first light-emitting element is turned on and a second light-emitting element is turned off in an embodiment.

Specifically, as shown in FIG. 15, when the first light-emitting element 1411 and the second light-emitting element 1412 are both turned on, the influence of the first sub-detection light in the horizontal direction and the influence of the second sub-detection light in the horizontal direction are mutually canceled out, and the first sub-polarized light beam finally formed is perpendicularly incident on the to-be-detected magnetic sample 12, so that the polar-MOKE testing can be achieved, and this polar-MOKE testing may be suitable for analyzing magnetic film with perpendicular anisotropy. As shown in FIG. 16, when only one of the first light-emitting element 1411 and the second light-emitting element 1412 is turned on, for example, when the first light-emitting element 1411 is turned on and the second light-emitting element 1412 is turned off, the first sub-linearly polarized light is obliquely incident on the to-be-detected magnetic sample 12, so that a longitudinal-MOKE testing can be achieved, and this longitudinal-MOKE testing may be suitable for analyzing magnetic film with in-plane anisotropy.

In an embodiment, the light source 141 further includes a circuit board, and the first light-emitting element 1411 and the second light-emitting element 1412 are spliced in parallel on a surface of the circuit board.

In the embodiment, the first light-emitting element 1411 and the second light-emitting element 1412 are spliced in parallel on the surface of the circuit board, so that a position of the first light-emitting element 1411 on the circuit board is symmetrical to a position of the second light-emitting element 1412 on the circuit board, and it is ensured that the influence of the first sub-detection light in the horizontal direction and the influence of the second sub-detection light in the horizontal direction can be mutually canceled out, thereby achieving the polar Kerr testing.

In an embodiment, in order to reduce the divergence angle of the light emitted from the light source 141 and improve the uniformity of the light emitted from the light source 141, the light source assembly 14 may further include a first light homogenization module 144 and a second light homogenization module 145. The first light homogenization module 144 is disposed on an optical axis of the first sub-detection light and is configured to perform light homogenization on the first sub-detection light. The second light homogenization module 145 is disposed on an optical axis of the second sub-detection light and is configured to perform light homogenization on the second sub-detection light. Optionally, the first light homogenization module 144 and the second light homogenization module 145 may both be light sticks.

In an embodiment, the object carrying assembly 11 includes an object carrying table 111 and a driving mechanism 112. The object carrying table 111 is configured to carry the to-be-detected magnetic sample 12, and ensure that the to-be-detected magnetic sample 12 will not be separated out under the high-speed rotation of the object carrying table 111. The driving mechanism 112 is connected to the object carrying table 111, and is configured to drive the object carrying table 111 to rotate and translate relative to the first magnetic field generation assembly.

The driving mechanism 112 may include a motor and a driving shaft, the motor is drivingly connected to the driving shaft, the driving shaft is connected to a position below a center of the object carrying table 111, and the driving shaft is driven by the motor to drive the object carrying table 111 to rotate and translate. It is to be understood that, the distance between the two groups of first magnetic assemblies 13 disposed opposite to each other should be satisfy a condition that when the object carrying assembly 11 performs the translation operation, the driving shaft can pass through the gap between the two groups of first magnetic assemblies 13 disposed opposite to each other without obstruction, so that the safety of the device in the testing process is ensured.

Specifically, after the driving mechanism 112 drives the object carrying table 111 to drive the to-be-detected magnetic sample 12 to rotate for one circle, the object carrying assembly 11 may be controlled to drive the to-be-detected magnetic sample 12 to translate a first distance in a predetermined direction, the rotation translation operation is repeatedly performed, so that the full coverage scanning of the to-be-detected magnetic sample 12 can be achieved.

In an embodiment, the line array scanning device further includes a processing assembly. The processing assembly includes a processor and a data acquisition device. The processor is configured to output a digital control signal. The data acquisition device is connected to the processor, the first detection assembly 16 and the object carrying assembly 11. The data acquisition device is configured to: perform a digital-to-analogue conversion processing on the digital control signal, and output an analogue control signal to the object carrying assembly 11 to control the object carrying assembly 11 to drive the to-be-detected magnetic sample 12 to rotate and translate, output a synchronous trigger signal to the first detection assembly 16 to control the first detection assembly 16 to synchronously detect polarization information, and acquire the magnetic domain uniformity information of the to-be-detected magnetic sample 12. The data acquisition device is further configured to perform an analog-to-digital conversion processing on the magnetic domain uniformity information, and transmit analog-to-digital converted magnetic domain uniformity information to the processor. The data acquisition device may control the rotational speed of the object carrying assembly 11 to be synchronous with the scanning frequency of the first detection assembly 16 and control the calibration, thereby achieving the synchronous acquisition of from line scanning signal to surface scanning signal, and further achieving the full coverage scanning.

Figure 17:
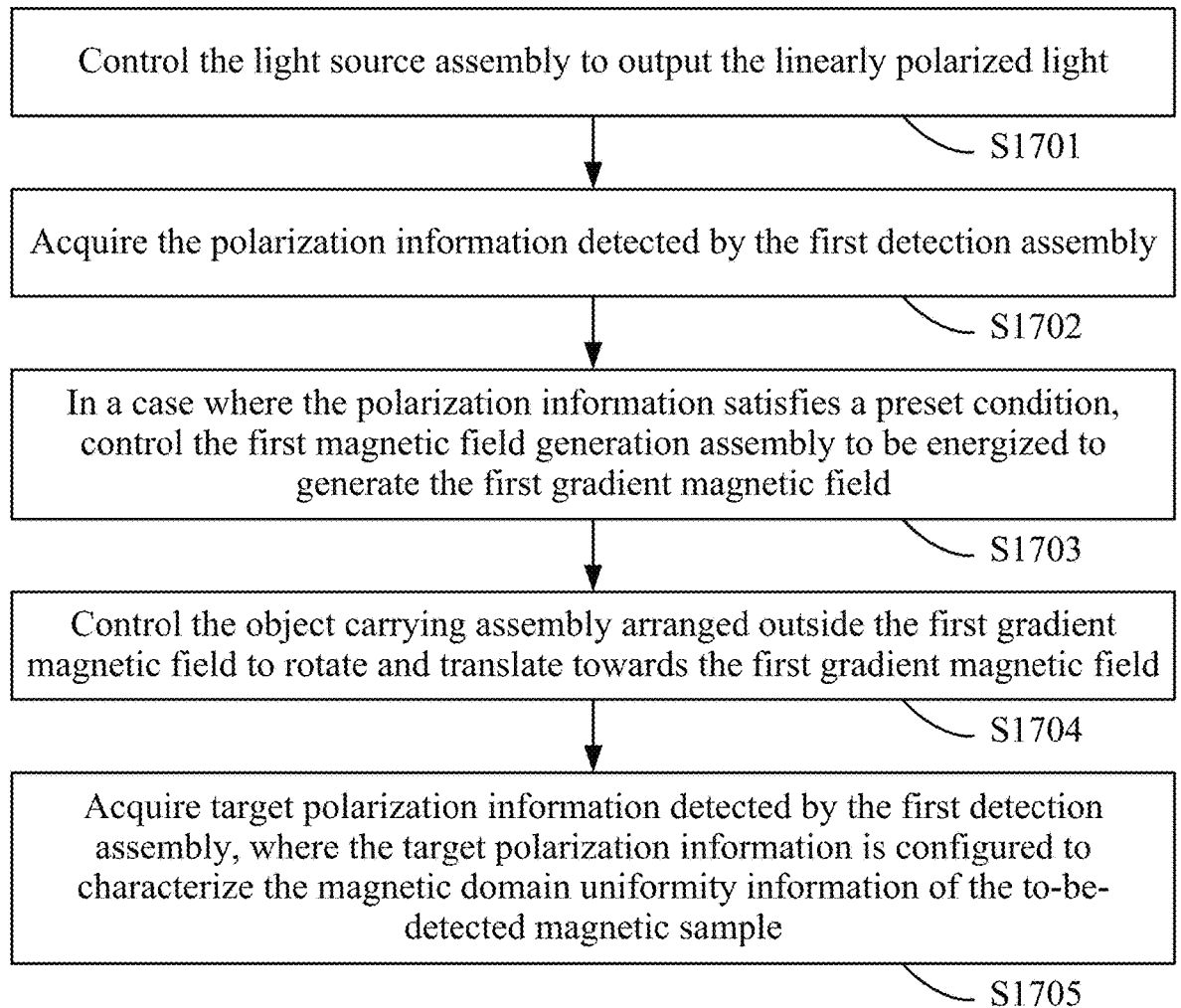
FIG. 17 is a flowchart of a control method of a linear array scanning device in an embodiment.

In an embodiment, as shown in FIG. 17, the present application further provides a control method of a linear array scanning device. The method is applied to the linear array scanning device in any one of the embodiments described above and includes steps described below.

In S1701, the light source assembly 14 is controlled to output the linearly polarized light.

In S1702, the polarization information detected by the first detection assembly 16 is acquired.

In S1703, in a case where the polarization information satisfies a preset condition, the first magnetic field generation assembly is controlled to be energized to generate the first gradient magnetic field.

In S1704, the object carrying assembly 11 arranged outside the first gradient magnetic field is controlled to rotate and translate towards the first gradient magnetic field.

In S1705, target polarization information detected by the first detection assembly 16 is acquired, where the target polarization information is configured to characterize the magnetic domain uniformity information of the to-be-detected magnetic sample 12.

The preset condition may be that a polarization angle of the incident linearly polarized light is perpendicular to a polarization direction of the polarization analyzer.

Specifically, when the first magnetic field generation assembly is powered off, a position of a polarization axis of the first detection assembly 16 is calibrated, so that the first detection assembly 16 extinguishes the incident linearly polarized light, and the polarization angle of the linearly polarized light reflected by the first detection region without the magnetic domain information is perpendicular to the polarization analyzer. After the first magnetic field generation assembly is energized, compared with the linear polarized light reflected by the first detection region without the magnetic domain information, the polarization angle of the first reflected linear polarized light with the magnetic domain information of the first detection region changes, in this case, the target polarization information detected by the first detection assembly 16 represents the magnetic domain uniformity information of the to-be-detected magnetic sample 12, thereby the magnetic domain uniformity information of the to-be-detected magnetic sample 12 is acquired.

The object carrying assembly 11 rotates from a position arranged outside the first gradient magnetic field and translates towards the first gradient magnetic field, in a translation process, the to-be-detected magnetic sample 12 is firstly saturated magnetized, then the to-be-detected magnetic sample 12 is affected by the first gradient magnetic field to change its own magnetic domain in the subsequent translation process, the first detection assembly 16 obtains the magnetic domain uniformity information about the to-be-detected magnetic sample 12 within the field of view thereof, whereby it is unnecessary to establish the reciprocation varying magnetic field, and the scanning process is simplified. Optionally, the rotation of the to-be-detected magnetic sample 12 may be high speed rotation.

In some embodiments, before the testing is started, when the first gradient magnetic field exists, a vertical gap is provided between a to-be-detected region of the to-be-detected magnetic sample 12 arranged outside the first gradient magnetic field and the first gradient magnetic field. When the first gradient magnetic field and the second gradient magnetic field exist, the vertical gap is provided between the to-be-detected region of the to-be-detected magnetic sample 12 and the first gradient magnetic field, where the spacing of the vertical gap may be set to be greater than or equal to zero.

In the control method of the linear array scanning device described above, the light source assembly 14 is controlled to output the linearly polarized light, and the polarization information detected by the first detection assembly 16 is acquired in a case where the first magnetic field generation assembly is powered off, so that whether the first detection assembly 16 is calibrated to a proper state is determined according to the polarization information detected by the first detection assembly 16. When the polarization information satisfies the preset condition, it represents that the first detection assembly 16 has been calibrated to the proper state. The first magnetic field generation assembly is controlled to be energized to generate the first gradient magnetic field, the object carrying assembly 11 arranged outside the first gradient magnetic field is controlled to rotate and translate towards the first gradient magnetic field, in a translation process, the to-be-detected magnetic sample 12 is firstly saturated magnetized, and then the to-be-detected magnetic sample 12 is affected by the first gradient magnetic field to change its own magnetic domain in the subsequent translation process, the first detection assembly 16 begins scanning when the to-be-detected magnetic sample 12 enters its detection field of view, so that the target polarization information detected by the first detection assembly 16 at this time is the magnetic domain uniformity information capable of characterizing the to-be-detected magnetic sample 12, to achieve the linear array scanning and simplify the scanning process. The magnetic domain uniformity information of one region may be obtained by one-time scanning; therefore, the scanning speed is improved, and thus the scanning time is greatly shortened.

In an embodiment, that the target polarization information detected by the first detection assembly 16 is acquired includes: the object carrying assembly 11 is controlled to perform a rotation translation operation. The rotation translation operation includes: the to-be-detected magnetic sample 12 is driven to rotate for one circle to obtain magnetic domain uniformity information of a circular ring where the first detection region is located; the object carrying assembly 11 is controlled to drive the to-be-detected magnetic sample 12 to translate a first distance (i.e., one step length) in a predetermined direction; and the rotation translation operation is repeatedly performed until a translation distance of the object carrying assembly 11 reaches a target distance.

Specifically, the rotation translation operation is repeatedly performed so that the distribution condition of the coercive force Hc of the entire to-be-detected magnetic sample 12 may be obtained. The step length is related to the scanning speed. The larger the step length is, the faster the scanning speed is. On the contrary, the smaller the step length is, the slower the scanning speed is, but the more data points obtained by scanning are. When the step length reaches the maximum (corresponding to the radial length of one scanning of the linear array camera), the scanning mode is a screening-detection mode, i. e., a region line scanning, and in this mode, the scanning speed is faster, which is suitable for the extraction of regional magnetic domain uniformity information of the to-be-detected magnetic sample 12. When the step length is not maximum, the scanning mode is a full-detection mode, i. e., a smooth line scanning, and in this mode, the scanning speed is reduced, but the number of data points obtained by scanning is increased, so that the full coverage scanning can be satisfied. Compared with the influence of the motion precision of an XY displacement table during the dot matrix scanning, the lateral resolution is relatively small. In the present application, the linear array camera is provided, so that the higher lateral resolution can be obtained, and the lateral resolution may reach 500 nm to 1 μm. In the present application, the step length may be determined according to actual requirements, which is not limited herein.

In an application, if the wafer is uniform, after the wafer is scanned for one circle, the position of the coercive field (Hc) of the magnetic hysteresis loop of the to-be-detected region is kept unchanged, that is, a circular ring is formed. Otherwise, the position of the region Hc is distorted, that is, the distribution of the coercive field Hc is displaced, that is, saw-toothed patterns or other irregular patterns are formed, which indicates that the region is not uniform. Based on the above-described principle, the non-uniform position of the magnetic thin film layer of the wafer may be quickly determined, thereby simplifying the scanning process and improving the scanning speed. In addition, information such as unevenness and dispersion of the magnetic domain coercive force of the sample may be obtained by calculating the roughness.

In an embodiment, the linear array scanning device further includes an excitation power supply electrically connected to the first magnetic field generation assembly. The control method further includes that: the object carrying assembly 11 is controlled to drive the to-be-detected magnetic sample 12 to move relative to the first magnetic field generation assembly. In a case where the first detection region is a feature detection region, the excitation power supply is controlled to apply a reverse current to the first magnetic field generation assembly, and the object carrying assembly 11 is controlled to drive the to-be-detected magnetic sample 12 to move to an initial position along an original movement path for testing. In this way, the return error of the to-be-detected magnetic sample 12 can be reduced, thereby effectively improving the accuracy of the testing result. The reverse current is introduced, so that not only the complexity of the mechanical movement structure can be reduced, but also the driving shaft at the center of the object carrying table 111 can avoid the first magnetic field generation assembly when moving, thereby ensuring the safety of the device in the testing process.

At the initial moment, when the first detection region is an edge region of the to-be-detected magnetic sample 12, the feature detection region is a central region of the to-be-detected magnetic sample 12. At the initial moment, when the first detection region is the central region of the to-be-detected magnetic sample 12, the feature detection region is the edge region of the to-be-detected magnetic sample 12.

In some embodiments, when the linear array scanning device measures the central region of the to-be-detected magnetic sample 12 from the edge region of the to-be-detected magnetic sample 12, at this time, a half magnetic hysteresis loop is obtained. After a direction of the gradient magnetic field is changed to the opposite direction, in this case, a testing is performed after it moves to the initial position along the original moving path to obtain a complete magnetic hysteresis loop, thereby determining the uniformity of the to-be-detected magnetic sample 12, and reducing the return error of the to-be-detected magnetic sample 12, and improving the test accuracy. In some embodiments, the initial position in this embodiment refers to that the linearly polarized light is initially projected on the to-be-detected magnetic sample 12, for example, when the linearly polarized light is initially projected on the edge region of the to-be-detected magnetic sample 12, the initial position is the edge region.

In an embodiment, the light source assembly 14 includes a first light-emitting element and a second light-emitting element, and the first light-emitting element is disposed adjacent to and in parallel with the second light-emitting element. That the light source assembly 14 is controlled to output the linearly polarized light includes: a type of the to-be-detected magnetic sample 12 is acquired; in a case where the to-be-detected magnetic sample 12 is a first type of sample, the first light-emitting element and the second light-emitting element are controlled to be turned on synchronously; and in a case where the to-be-detected magnetic sample 12 is a second type of sample, the first light-emitting element is controlled to be turned on and the second light-emitting element is controlled to be turned off.

The material of the first type of sample is magnetic film with perpendicular anisotropy. The material of the second type of sample is magnetic film with perpendicular anisotropy.

It is to be understood that although the steps in the flowchart of FIG. 17 are sequentially displayed as indicated by arrows, the steps are not necessarily sequentially performed in the order indicated by the arrows. Unless explicitly stated herein, the execution of these steps is not strictly limited in order, and these steps may be executed in other orders. In addition, at least a part of the steps in FIG. 17 may include multiple steps or multiple stages, these steps or stages are not necessarily performed at the same moment, but may be performed at different moments, and an execution sequence of these steps or stages is not necessarily performed sequentially, but may be performed in turn or alternating with other steps or at least a part of steps or stages within other steps.

Those of ordinary skill in the art may understand that all or part of flows of the methods in the above-described embodiments may be implemented by using a computer program to instruct the related hardware, the computer program may be stored in a non-volatile computer-readable storage medium, and the computer program, when executed, may include the flows of the embodiments of the methods described above. Any references to memories, storages, databases, or other media used in the embodiments provided in the present application may include at least one of a non-volatile memory and a volatile memory. The non-volatile memory may include a read-only memory (ROM), a magnetic tape, a floppy disk, a flash memory, or an optical memory and the like. The volatile memory may include a random access memory (RAM) or an external cache memory. By way of illustration and not limitation, the RAM may be in various forms, such as a static random access memory (SRAM) or a dynamic random access memory (DRAM).

In the description of this specification, descriptions of the reference terms "some embodiments", "other embodiments", "ideal embodiments" and the like mean that specific features, structures, materials described in connection with the embodiments or examples, or features are included in at least an embodiment or example of the present application. In this specification, the schematic description of the above-described terms does not necessarily refer to the same embodiment or example.

The technical features of the above embodiments may be arbitrarily combined, and in order to make the description concise, all possible combinations of the technical features in the above-described embodiments are not described, however, as long as no contradiction exists between the combinations of the technical features, it should be considered as falling within the scope recited in this specification.

The above embodiments only express several implementations of the present application, and the description thereof is relatively specific and detailed, but cannot be construed as limiting the scope of the invention patent. It is to be noted that, for those of ordinary skill in the art, several modifications and improvements may be made without departing from the concept of the present application, which all fall within the scope of protection of the present application. Therefore, the scope of protection of this patent application shall be defined by the appended claims.

What is claimed is:

1. A linear array scanning device, comprising:
   an object carrying assembly, which is configured to carry a to-be-detected magnetic sample and drive the to-be-detected magnetic sample to move;
   a first magnetic field generation assembly, which comprises two groups of first magnetic assemblies disposed opposite to each other and is configured to generate a first gradient magnetic field;
   a light source assembly, which is configured to output linearly polarized light;

a first light splitting assembly, which is disposed on an emergent light path of the light source assembly and is configured to receive the linearly polarized light, split the linearly polarized light into a plurality of first sub-linearly polarized light, and project first sub-linearly polarized light propagating along a first direction among the plurality of first sub-linearly polarized light to a first detection region of the to-be-detected magnetic sample; and a first detection assembly, which is configured to receive first reflected linearly polarized light reflected back from the first detection region, detect polarization information of the first reflected linearly polarized light, and acquire magnetic domain uniformity information of the to-be-detected magnetic sample;

wherein the first detection assembly comprises a first polarization analyzer, which is configured to detect a polarization state and an angle of the first reflected linearly polarized light; and a first linear array camera, which is disposed coaxially with the first polarization analyzer and is configured to receive the first reflected linearly polarized light passing through the first polarization analyzer and acquire magnetic domain uniformity information of a magnetic thin film layer in the first detection region;

wherein the object carrying assembly comprises an object carrying table, which is configured to carry the to-be-detected magnetic sample; and a driving mechanism, which is connected to the object carrying table and is configured to drive the object carrying table arranged outside the first gradient magnetic field to rotate and translate towards the first magnetic field generation assembly;

wherein a first optical channel penetrating through a first magnetic assembly among the two groups of first magnetic assemblies is disposed within the first magnetic assembly, and part of the first light splitting assembly is disposed in the first optical channel; and wherein the first magnetic assembly comprises a first iron core and a first coil, the first iron core comprises a first main body portion and a first extension portion, the first coil is wound on the first main body portion, the first extension portion is disposed to be close to the object carrying assembly relative to the first main body portion, and the first extension portion is obliquely disposed towards an axis center of the first optical channel.

2. The linear array scanning device of claim 1, wherein the first extension portion comprises a first end and a second end, the second end is disposed away from the first main body portion relative to the first end, and a vertical cross-sectional area of the first extension portion is gradually reduced from the first end to the second end.

3. The linear array scanning device of claim 1, wherein the first light splitting assembly comprises:
a first light splitting mirror, which is disposed on an optical axis of the linearly polarized light and is configured to split the linearly polarized light into the plurality of first sub-linearly polarized light; and
a first focusing lens, which is disposed in the first optical channel and disposed coaxially with the first light splitting mirror, and is configured to receive the first sub-linearly polarized light propagating along the first direction among the plurality of first sub-linearly polarized light and converge the first sub-linearly polarized light propagating along the first direction among the plurality of first sub-linearly polarized light to the first detection region of the to-be-detected magnetic sample.

4. The linear array scanning device of claim 3, wherein the first focusing lens comprises a first housing, and the first housing is made of a non-magnetic conductive material.

5. The linear array scanning device of claim 3, further comprising:
a second light splitting mirror, which is configured to receive the first reflected linearly polarized light reflected from the first detection region and project part of the first reflected linearly polarized light to the first polarization analyzer; and
a first imaging assembly, which is disposed coaxially with the second light splitting mirror and is configured to receive remaining part of the first reflected linearly polarized light to image the to-be-detected magnetic sample.

6. The linear array scanning device of claim 1, wherein the plurality of first sub-linearly polarized light comprises first sub-linearly polarized light propagating along the first direction and first sub-linearly polarized light propagating along a second direction, and the linear array scanning device further comprises:
a second magnetic field generation assembly, which comprises two groups of second magnetic assemblies disposed opposite to each other and is configured to generate a second gradient magnetic field, wherein the object carrying assembly is disposed within the second gradient magnetic field;
a second light splitting assembly, which is configured to receive the first sub-linearly polarized light propagating along the second direction and project the first sub-linearly polarized light propagating along the second direction to a second detection region of the to-be-detected magnetic sample; and
a second detection assembly, which is configured to receive second reflected linearly polarized light reflected back from the second detection region, detect polarization information of the second reflected linearly polarized light, and acquire the magnetic domain uniformity information of the to-be-detected magnetic sample.

7. The linear array scanning device of claim 1, wherein the light source assembly comprises:
a light source, which is configured to generate detection light and output the detection light;
a collimator, which is disposed on an optical axis of the detection light and configured to collimate the detection light; and
a polarizer, which is disposed on the optical axis of the detection light and configured to receive the collimated detection light and output the linearly polarized light.

8. The linear array scanning device of claim 7, wherein the detection light comprises first sub-detection light and/or second sub-detection light, and the light source comprises:
a first light-emitting element, which is configured to generate the first sub-detection light and output the first sub-detection light; and
a second light-emitting element, which is disposed adjacent to and in parallel with the first light-emitting element and is configured to generate the second sub-detection light and output the second sub-detection light, wherein the first light-emitting element and the second light-emitting element are independently turned on and turned off.

9. The linear array scanning device of claim 8, wherein the light source further comprises a circuit board, and the first light-emitting element and the second light-emitting element are spliced in parallel on a surface of the circuit board.

10. The linear array scanning device of claim 1, further comprising a processing assembly, wherein the processing assembly comprises:
   a processor, which is configured to output a digital control signal; and
   a data acquisition device, which is connected to the processor, the first detection assembly and the object carrying assembly, wherein the data acquisition device is configured to: perform a digital-to-analogue conversion processing on the digital control signal, output an analog control signal to the object carrying assembly to control the object carrying assembly to drive the to-be-detected magnetic sample to rotate and translate, output a synchronization trigger signal to the first detection assembly to control the first detection assembly to synchronously detect the polarization information, and acquire the magnetic domain uniformity information of the to-be-detected magnetic sample; and the data acquisition device is further configured to perform an analogue-to-digital conversion processing on the magnetic domain uniformity information, and transmit analogue-to-digital converted magnetic domain uniformity information to the processor.

11. A control method of a linear array scanning device, applied to the linear array scanning device of claim 1, comprising:
   controlling the light source assembly to output the linearly polarized light;
   acquiring the polarization information detected by the first detection assembly;
   in a case where the polarization information satisfies a preset condition, controlling the first magnetic field generation assembly to be energized to generate the first gradient magnetic field;
   controlling the object carrying assembly arranged outside the first gradient magnetic field to rotate and translate towards the first gradient magnetic field; and
   acquiring target polarization information detected by the first detection assembly, wherein the target polarization information is configured to characterize the magnetic domain uniformity information of the to-be-detected magnetic sample.

12. The control method of a linear array scanning device of claim 11, wherein acquiring the target polarization information detected by the first detection assembly comprises:
   controlling the object carrying assembly to perform a rotation translation operation, wherein the rotation translation operation comprises: driving the to-be-detected magnetic sample to rotate for one circle to obtain magnetic domain uniformity information of a circular ring where the first detection region is located;
   controlling the object carrying assembly to drive the to-be-detected magnetic sample to translate a first distance in a predetermined direction; and
   repeatedly performing the rotation translation operation until a translation distance of the object carrying assembly reaches a target distance.

13. The control method of a linear array scanning device of claim 11, wherein the linear array scanning device further comprises an excitation power supply electrically connected to the first magnetic field generation assembly, and the method further comprises:
   controlling the object carrying assembly to drive the to-be-detected magnetic sample to move relative to the first magnetic field generation assembly; and
   in a case where the first detection region is a feature detection region, controlling the excitation power supply to apply a reverse current to the first magnetic field generation assembly, and controlling the object carrying assembly to drive the to-be-detected magnetic sample to move to an initial position along an original movement path.

14. The control method of a linear array scanning device of claim 11, wherein the light source assembly comprises a first light-emitting element and a second light-emitting element, the first light-emitting element is disposed adjacent to and in parallel with the second light-emitting element, and wherein controlling the light source assembly to output the linearly polarized light comprises:
   acquiring a type of the to-be-detected magnetic sample;
   in a case where the to-be-detected magnetic sample is a first type of sample, controlling the first light-emitting element and the second light-emitting element to be turned on synchronously; and
   in a case where the to-be-detected magnetic sample is a second type of sample, controlling the first light-emitting element to be turned on and the second light-emitting element to be turned off.

* * * * *